US012598661B2

(12) United States Patent
Zhang et al.

(10) Patent No.: US 12,598,661 B2
(45) Date of Patent: Apr. 7, 2026

(54) DATA TRANSMISSION METHOD AND SYSTEM

(71) Applicant: HONOR DEVICE CO., LTD., Shenzhen (CN)

(72) Inventors: Chao Zhang, Shenzhen (CN); Ying Liu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 300 days.

(21) Appl. No.: 18/276,339

(22) PCT Filed: Dec. 15, 2022

(86) PCT No.: PCT/CN2022/139308
§ 371 (c)(1),
(2) Date: Aug. 8, 2023

(87) PCT Pub. No.: WO2023/173856
PCT Pub. Date: Sep. 21, 2023

(65) Prior Publication Data
US 2025/0024533 A1 Jan. 16, 2025

(30) Foreign Application Priority Data
Mar. 17, 2022 (CN) .......................... 202210262090.6

(51) Int. Cl.
*H04W 76/14* (2018.01)
*H04W 4/80* (2018.01)

(52) U.S. Cl.
CPC ............. *H04W 76/14* (2018.02); *H04W 4/80* (2018.02)

(58) Field of Classification Search
CPC .. H04W 76/14; H04W 4/80; G09G 2340/145; G09G 2354/00; G09G 2370/02; G06F 3/1454; G06F 9/4411; G06F 9/451
See application file for complete search history.

(56) References Cited

U.S. PATENT DOCUMENTS 9,357,492 B2 5/2016 Malik et al.
10,171,558 B2 1/2019 Singh et al.
(Continued)

FOREIGN PATENT DOCUMENTS

CN 103825932 A 5/2014
CN 104270826 A 1/2015
(Continued)

OTHER PUBLICATIONS

Li Hui;"Research on Android Wear based data security protection technology for intelligent device"; Modern Electronics Technique;Oct. 2016;5pages.
(Continued)

*Primary Examiner* — Michael A Keller
(74) *Attorney, Agent, or Firm* — WOMBLE BOND DICKINSON (US) LLP

(57) ABSTRACT
This application provides a data transmission method and system, which relate to the field of electronic devices, and can simplify a process in which a user views an internal file of a smartwatch on a computer. The method includes: A second electronic device establishes a connection with a third electronic device; the third electronic device sends first data to the second electronic device through the established connection; the second electronic device receives the first data and forwards the first data to a first electronic device; and the first electronic device receives and displays the first data.

20 Claims, 20 Drawing Sheets

Notebook computer 01 sends an instruction to smartwatch 03

03 — Send an instruction — 02 — Send an instruction — 01

Send a file — Send a file

Smartwatch 03 sends a file to notebook computer 01

(56) References Cited

U.S. PATENT DOCUMENTS

| | | | |
|---|---|---|---|
| 11,115,882 B2 | 9/2021 | Wang et al. | |
| 11,385,930 B2 | 7/2022 | Frost | |
| 11,503,491 B2 | 11/2022 | Lee et al. | |
| 2010/0304674 A1* | 12/2010 | Kim | H04W 76/10 |
| | | | 455/41.2 |
| 2013/0088605 A1* | 4/2013 | Quarfordt | H04W 8/005 |
| | | | 348/207.1 |
| 2013/0324169 A1 | 12/2013 | Kamal et al. | |
| 2016/0174021 A1* | 6/2016 | Lim | H04L 47/6275 |
| | | | 370/310 |
| 2020/0281033 A1* | 9/2020 | Bhattacharya | H04W 76/14 |
| 2020/0383157 A1 | 12/2020 | Lee et al. | |
| 2021/0051458 A1 | 2/2021 | Cheong et al. | |
| 2021/0400145 A1 | 12/2021 | Yoon | |
| 2022/0121413 A1 | 4/2022 | Zhang et al. | |
| 2022/0159471 A1 | 5/2022 | Li et al. | |
| 2022/0368792 A1 | 11/2022 | Bi | |

FOREIGN PATENT DOCUMENTS

| | | | |
|---|---|---|---|
| CN | 105827282 A | 8/2016 | |
| CN | 106331426 A | 1/2017 | |
| CN | 106687932 A | 5/2017 | |
| CN | 108877956 A | 11/2018 | |
| CN | 110337790 A | 10/2019 | |
| CN | 110519305 A | 11/2019 | |
| CN | 110611905 A | 12/2019 | |
| CN | 110998528 A | 4/2020 | |
| CN | 111049580 A | 4/2020 | |
| CN | 111083293 A | 4/2020 | |
| CN | 111148081 A | 5/2020 | |
| CN | 111385781 A | 7/2020 | |
| CN | 112152884 A | 12/2020 | |
| CN | 113141637 A | 7/2021 | |
| CN | 113504866 A | 10/2021 | |
| CN | 113808379 A | 12/2021 | |
| CN | 114356272 A | 4/2022 | |
| WO | 2015020994 A2 | 2/2015 | |
| WO | 2021052200 A1 | 3/2021 | |
| WO | 2021091295 A1 | 5/2021 | |

OTHER PUBLICATIONS

Fang Yanan;"Bluetooth and GPRS communication technology based real-time health Information collection and alarm monitoring system";Inner Mongolia Science Technology&Economy;Sep. 2018;3pages.

* cited by examiner

Notebook computer

1700

1800

1

DATA TRANSMISSION METHOD AND SYSTEM

CROSS-REFERENCE TO RELATED APPLICATIONS

This application is a national stage of International Application No. PCT/CN2022/139308, filed on Dec. 15, 2022, which claims priority to Chinese Patent Application No. 202210262090.6, filed on Mar. 17, 2022. The disclosures of both of the aforementioned applications are hereby incorporated by reference in their entireties.

TECHNICAL FIELD

This application relates to the field of electronic devices, and in particular, to a data transmission method and system.

BACKGROUND

With the popularity of smart devices and the development of communication technologies, smart wearable devices, such as smartwatches, are favored by users for their increasing functions. For example, a user can use a smartwatch to check the time, and the user can further use the smartwatch to monitor the user's health or use the smartwatch to play music. During the use of the smartwatch, the smartwatch generates relevant files, such as a sports record of the user recorded by the smartwatch, health data of the user recorded by the smartwatch, a maintenance log of the smartwatch, and other files.

However, these relevant files are usually stored in the smartwatch, and when the user needs to view the relevant files on a computer, the user needs to send the relevant files stored in the smartwatch to a mobile phone first, so that the mobile phone saves the relevant files stored in the smartwatch. Then, the user needs to send the relevant files stored in the mobile phone to the computer. Therefore, the process in which the user views the relevant files on the computer is complicated.

SUMMARY

Embodiments of this application provide a data transmission method and system that can simplify a process in which a user views an internal file of a smartwatch on a computer.

To achieve the foregoing objective, the following technical solutions are used in the embodiments of this application:

According to a first aspect, an embodiment of this application provides a data transmission method, applied to a data transmission system, and the data transmission system may include: a first electronic device, a second electronic device connected to the first electronic device, and a third electronic device, where the data transmission method includes: The second electronic device establishes a connection with the third electronic device; the third electronic device sends first data to the second electronic device through the established connection; the second electronic device receives the first data and forwards the first data to the first electronic device; and the first electronic device receives and displays the first data.

According to the method in the first aspect, an instruction channel is established between the first electronic device and the third electronic device through the second electronic device, so that the third electronic device can send the first data to the first electronic device through the second electronic device, and the first electronic device can display the data sent by the third electronic device. That is, the third electronic device can send the first data directly to the first electronic device through the second electronic device, and the second electronic device forwards the first data sent by the third electronic device without first storing the first data into the second electronic device and then sending the first data stored in the second electronic device to the first electronic device. Therefore, this can simplify the process in which the user views data of the third electronic device on the first electronic device.

With reference to the first aspect, in another possible implementation, that the second electronic device establishes a connection with the third electronic device may include: The first electronic device sends a first connection instruction to the second electronic device, where the first connection instruction is used to instruct the second electronic device to establish a connection with the third electronic device; and the second electronic device establishes a connection with the third electronic device in response to the first connection instruction received.

Based on this possible implementation, the second electronic device can establish a connection with the third electronic device according to the connection instruction sent by the first electronic device, without requiring the user to perform operations on the second electronic device and the third electronic device, thereby reducing user operations. With reference to the first aspect, in another possible implementation, before the first electronic device sends the first connection instruction to the second electronic device, the data transmission method may further include: The first electronic device sends a scan instruction to the second electronic device, where the scan instruction is used to instruct the second electronic device to scan for a connectable electronic device; and the second electronic device sends first indication information to the first electronic device when the second electronic device detects a connectable electronic device through scanning, where the first indication information is used for indicating a connectable electronic device detected by the second electronic device through scanning, and the connectable electronic device includes the third electronic device.

Based on this possible implementation, when the instruction channel between the first electronic device and the third electronic device is established through the second electronic device, the second electronic device scans for a connectable electronic device according to the scan instruction sent by the first electronic device, and connects to the third electronic device according to the connection instruction sent by the first electronic device, without requiring the user to perform operations on the second electronic device and the third electronic device, thereby reducing user operations.

With reference to the first aspect, in another possible implementation, that the second electronic device establishes a connection with the third electronic device in response to the first connection instruction received may include: The second electronic device sends a second connection instruction to the third electronic device based on the first connection instruction received; and the third electronic device establishes a connection with the second electronic device in response to the second connection instruction received.

Based on this possible implementation, the third electronic device can establish a connection with the second electronic device according to the connection instruction sent by the second electronic device, without requiring the user to perform operations on the second electronic device and the third electronic device, thereby reducing user operations. With reference to the first aspect, in another possible implementation, before the first electronic device sends the scan instruction to the second electronic device, the data transmission method may further include: The first electronic device displays a first interface, where the first interface includes a first control, and the first control is used for triggering the first electronic device to send the scan instruction to the second electronic device; and the first electronic device receives a first operation of a user for the first control.

Based on this possible implementation, the user can perform an operation on the interface of the first electronic device to trigger the second electronic device to scan for a surrounding electronic device, which does not require the user to perform operations on the second electronic device, thereby reducing operations of the user on the second electronic device.

With reference to the first aspect, in another possible implementation, before the first electronic device sends the first connection instruction to the second electronic device, the data transmission method may further include: The first electronic device displays the connectable electronic device, where the connectable electronic device includes the third electronic device; and the first electronic device receives a second operation of a user for the third electronic device.

Based on this possible implementation, the user can perform an operation on the interface of the first electronic device to trigger the second electronic device to establish a connection with the third electronic device, which does not require the user to perform operations on the second electronic device and the third electronic device, thereby reducing operations of the user on the second electronic device and the third electronic device.

With reference to the first aspect, in another possible implementation, the first connection instruction includes an identifier of the third electronic device.

Based on this possible implementation, the first connection instruction includes the identifier of the third electronic device, the second electronic device can connect to the third electronic device based on the identifier of the third electronic device, and the user does not need to select a device that needs to be connected. This can further reduce user operations.

With reference to the first aspect, in another possible implementation, the second connection instruction includes a first identifier, and the first identifier is used to instruct the third electronic device to automatically establish a connection with the second electronic device.

Based on this possible implementation, the second connection instruction includes the first identifier that instructs the third electronic device to automatically establish a connection with the second electronic device. When the third electronic device determines that the second connection instruction includes the first identifier, the third electronic device can automatically establish a connection with the second electronic device, and the user does not need to perform confirmation on the third electronic device. This can further reduce user operations.

With reference to the first aspect, in another possible implementation, the first interface further includes a second control, and before the third electronic device sends the first data to the second electronic device through the established connection, the data transmission method may further include: The first electronic device receives a third operation of the user for the second control; the first electronic device sends an obtaining instruction to the second electronic device in response to the third operation, where the obtaining instruction includes an identifier of the first data; and the second electronic device receives the obtaining instruction, and forwards the obtaining instruction to the third electronic device.

Based on this possible implementation, after the instruction channel is established between the first electronic device and the third electronic device through the second electronic device, the first electronic device may send an instruction to the third electronic device through the second electronic device. After the third electronic device receives the instruction sent by the first electronic device, the third electronic device may send relevant data to the first electronic device through the second electronic device, so that the user can view the internally stored file of the third electronic device on the first electronic device, which is convenient for the user to use.

With reference to the first aspect, in another possible implementation, that the first electronic device displays the first data may include: The first electronic device displays the first data in a preset manner based on a type of the first data.

Based on this possible implementation, the first data is displayed in a preset manner based on the type of the first data. It may be convenient for the user to manage the first data on the first electronic device, thereby facilitating the use of the user.

With reference to the first aspect, in another possible implementation, the first electronic device is a computer, the second electronic device is a mobile phone, and the third electronic device is a wearable electronic device.

Based on this possible implementation, after the instruction channel between the computer and the wearable electronic device is established through the mobile phone, the computer can send an instruction to the wearable electronic device through the mobile phone, and after receiving the instruction sent by the computer, the wearable electronic device can send the relevant data to the computer through the mobile phone, so that the user can view the internally stored file of the wearable electronic device on the computer, which is convenient for the user.

According to the second aspect, an embodiment of this application provides a data transmission method applied to a first electronic device, and the first electronic device is connected to a second electronic device. The data transmission method may include: The first electronic device receives first data forwarded by the second electronic device, where the first data is data sent by a third electronic device to the second electronic device through a connection established between the third electronic device and the second electronic device; and the first electronic device displays the first data.

According to the method in the second aspect, an instruction channel is established between the first electronic device and the third electronic device through the second electronic device, so that the third electronic device can send the first data to the first electronic device through the second electronic device, and the first electronic device can display the data sent by the third electronic device. That is, the third electronic device can send the first data directly to the first electronic device through the second electronic device, and the second electronic device forwards the first data sent by the third electronic device without first storing the first data into the second electronic device and then sending the first data stored in the second electronic device to the first electronic device. Therefore, this can simplify the process in which the user views data of the third electronic device on the first electronic device.

With reference to the second aspect, in another possible implementation, before the first electronic device receives the first data sent by the second electronic device, the data transmission method may further include: The first electronic device sends a first connection instruction to the second electronic device, where the first connection instruction is used to instruct the second electronic device to establish a connection with the third electronic device.

Based on this possible implementation, the second electronic device can establish a connection with the third electronic device according to the connection instruction sent by the first electronic device, without requiring the user to perform operations on the second electronic device and the third electronic device, thereby reducing user operations.

With reference to the second aspect, in another possible implementation, before the first electronic device sends the first connection instruction to the second electronic device, the data transmission method may further include: The first electronic device sends a scan instruction to the second electronic device, where the scan instruction is used to instruct the second electronic device to scan a connectable electronic device; and the first electronic device receives first indication information sent by the second electronic device; where the first indication information is used for indicating a connectable electronic device detected by the second electronic device through scanning, and the connectable electronic device includes the third electronic device.

Based on this possible implementation, when the instruction channel between the first electronic device and the third electronic device is established through the second electronic device, the second electronic device may scan a connectable electronic device according to the scanning instruction sent by the first electronic device, and connect to the third electronic device according to the connection instruction sent by the first electronic device, without requiring the user to perform operations on the second electronic device and the third electronic device, thereby reducing user operations.

With reference to the second aspect, in another possible implementation, before the first electronic device sends the scan instruction to the second electronic device, the data transmission method may further include: The first electronic device displays a first interface, where the first interface includes a first control, and the first control is used for triggering the first electronic device to send the scan instruction to the second electronic device; and the first electronic device receives a first operation of a user for the first control.

With reference to the second aspect, in another possible implementation, before the first electronic device sends the scan instruction to the second electronic device, the data transmission method may further include: The first electronic device displays a first interface, where the first interface includes a first control, and the first control is used for triggering the first electronic device to send the scan instruction to the second electronic device; and the first electronic device receives a first operation of a user for the first control.

Based on this possible implementation, the user can perform an operation on the interface of the first electronic device to trigger the second electronic device to scan a surrounding electronic device, which does not require the user to perform operations on the second electronic device, thereby reducing operations of the user on the second electronic device.

With reference to the second aspect, in another possible implementation, before the first electronic device sends the first connection instruction to the second electronic device, the data transmission method may further include: The first electronic device displays the connectable electronic device, where the connectable electronic device includes the third electronic device; and the first electronic device receives a second operation of a user for the third electronic device.

Based on this possible implementation, the user can perform an operation on the interface of the first electronic device to trigger the second electronic device to establish a connection with the third electronic device, which does not require the user to perform operations on the second electronic device and the third electronic device, thereby reducing operations of the user on the second electronic device and the third electronic device.

With reference to the second aspect, in another possible implementation, the first connection instruction includes an identifier of the third electronic device.

Based on this possible implementation, the first connection instruction includes the identifier of the third electronic device, the second electronic device can connect to the third electronic device based on the identifier of the third electronic device, and the user does not need to select a device that needs to be connected. This can further reduce user operations.

With reference to the second aspect, in another possible implementation, the first interface further includes a second control, and before the first electronic device receives the first data forwarded by the second electronic device, the data transmission method may further include: The first electronic device receives a third operation of the user for the second control; and the first electronic device sends an obtaining instruction to the second electronic device in response to the third operation, where the obtaining instruction includes an identifier of the first data.

Based on this possible implementation, after the instruction channel is established between the first electronic device and the third electronic device through the second electronic device, the first electronic device may send an instruction to the third electronic device through the second electronic device. After the third electronic device receives the instruction sent by the first electronic device, the third electronic device may send relevant data to the first electronic device through the second electronic device, so that the user can view the internally stored file of the third electronic device on the first electronic device, which is convenient for the user to use.

With reference to the second aspect, in another possible implementation, that the first electronic device displays the first data may include: The first electronic device displays the first data in a preset manner based on a type of the first data.

Based on this possible implementation, the first data is displayed in a preset manner based on the type of the first data. It may be convenient for the user to manage the first data on the first electronic device, thereby facilitating the use of the user.

With reference to the second aspect, in another possible implementation, before the first electronic device sends the scan instruction to the second electronic device, the data transmission method may further include: The first electronic device sends a first instruction to the second electronic device, where the first instruction is used to instruct the second electronic device to establish a connection between a port of the second electronic device and a port of the first electronic device; the first electronic device sends a second instruction to the second electronic device, where the second instruction is used to instruct the second electronic device to enable a service corresponding to a first application, and the first application is used for scanning a connectable electronic device; and the first electronic device establishes a socket.

Based on this possible implementation, the user can perform an operation on the interface of the first electronic device to trigger the first electronic device to establish a connection with the second electronic device, which does not require the user to perform operations on the second electronic device, thereby reducing operations of the user on the second electronic device.

With reference to the second aspect, in another possible implementation, the first electronic device is a computer, the second electronic device is a mobile phone, and the third electronic device is a wearable electronic device.

Based on this possible implementation, after the instruction channel between the computer and the wearable electronic device is established through the mobile phone, the computer can send an instruction to the wearable electronic device through the mobile phone, and after receiving the instruction sent by the computer, the wearable electronic device can send the relevant data to the computer through the mobile phone, so that the user can view the internally stored file of the wearable electronic device on the computer, which is convenient for the user.

According to a third aspect, an embodiment of this application provides a data transmission method applied to a second electronic device, and the second electronic device is connected to a first electronic device. The data transmission method may include: The second electronic device establishes a connection with a third electronic device; the second electronic device receives, through the established connection, first data sent by the third electronic device; and the second electronic device forwards the first data to the first electronic device.

According to the method in the third aspect, an instruction channel is established between the first electronic device and the third electronic device through the second electronic device, so that the third electronic device can send the first data to the first electronic device through the second electronic device, and the first electronic device can display the data sent by the third electronic device. That is, the third electronic device can send the first data directly to the first electronic device through the second electronic device, and the second electronic device forwards the first data sent by the third electronic device without first storing the first data into the second electronic device and then sending the first data stored in the second electronic device to the first electronic device. Therefore, this can simplify the process in which the user views data of the third electronic device on the first electronic device.

With reference to the third aspect, in another possible implementation, that the second electronic device establishes a connection with the third electronic device may include: The second electronic device receives a first connection instruction sent by the first electronic device, where the first connection instruction is used to instruct the second electronic device to establish a connection with the third electronic device; and the second electronic device establishes a connection with the third electronic device in response to the first connection instruction received.

Based on this possible implementation, the second electronic device can establish a connection with the third electronic device according to the connection instruction sent by the first electronic device, without requiring the user to perform operations on the second electronic device and the third electronic device, thereby reducing user operations.

With reference to the third aspect, in another possible implementation, before the second electronic device receives the first connection instruction sent by the first electronic device, the data transmission method may further include: the second electronic device receives a scan instruction sent by the first electronic device, where the scan instruction is used to instruct the second electronic device to scan a connectable electronic device; and when the second electronic device detects a connectable electronic device through scanning, the second electronic device sends first indication information to the first electronic device, where the first indication information is used to indicate the connectable electronic device detected by the second electronic device through scanning, and the connectable electronic device includes the third electronic device.

Based on this possible implementation, the user can perform an operation on the interface of the first electronic device to trigger the second electronic device to scan a surrounding electronic device, which does not require the user to perform operations on the second electronic device, thereby reducing operations of the user on the second electronic device.

With reference to the third aspect, in another possible implementation, that the second electronic device establishes a connection with the third electronic device in response to the first connection instruction received may include: the second electronic device sends a second connection instruction to the third electronic device based on the first connection instruction received, where the second connection instruction is used to instruct the third electronic device to establish a connection with the second electronic device, so that the third electronic device establishes a connection with the second electronic device in response to the second connection instruction received.

Based on this possible implementation, the third electronic device can establish a connection with the second electronic device according to the connection instruction sent by the second electronic device, without requiring the user to perform operations on the third electronic device, thereby reducing user operations on the third electronic device.

With reference to the third aspect, in another possible implementation, the first connection instruction includes an identifier of the third electronic device.

Based on this possible implementation, the first connection instruction includes the identifier of the third electronic device, the second electronic device can connect to the third electronic device based on the identifier of the third electronic device, and the user does not need to select a device that needs to be connected. This can further reduce user operations.

With reference to the third aspect, in another possible implementation, the second connection instruction includes a first identifier, and the first identifier is used to instruct the third electronic device to automatically establish a connection with the second electronic device.

Based on this possible implementation, the second connection instruction includes the first identifier that instructs the third electronic device to automatically establish a connection with the second electronic device. When the third electronic device determines that the second connection instruction includes the first identifier, the third electronic device can automatically establish a connection with the second electronic device, and the user does not need to perform confirmation on the third electronic device. This can further reduce user operations.

With reference to the third aspect, in another possible implementation, before the second electronic device receives, through the established connection, first data sent by the third electronic device, the data transmission method may further include: the second electronic device receives an obtaining instruction sent by the first electronic device, where the obtaining instruction includes an identifier of the first data; and the second electronic device forwards the obtaining instruction to the third electronic device; the second electronic device receives the first data sent by the third device; and the second electronic device sends the first data to the first device.

Based on this possible implementation, after the instruction channel is established between the first electronic device and the third electronic device through the second electronic device, the first electronic device may send an instruction to the third electronic device through the second electronic device. After the third electronic device receives the instruction sent by the first electronic device, the third electronic device may send relevant data to the first electronic device through the second electronic device, so that the user can view the internally stored file of the third electronic device on the first electronic device, which is convenient for the user to use.

With reference to the third aspect, in another possible implementation, before the second electronic device receives the scan instruction sent by the first electronic device, the data transmission method may further include: The second electronic device receives a first instruction sent by the first electronic device, where the first instruction is used to instruct the second electronic device to establish a connection between a port of the second electronic device and a port of the first electronic device; the second electronic device establishes a connection between the port of the second electronic device and the port of the first electronic device based on the first instruction; the second electronic device receives a second instruction sent by the first electronic device, where the second instruction is used to instruct the second electronic device to enable a service corresponding to a first application, and the first application is used for scanning a connectable electronic device; and the second electronic device enables the service corresponding to the first application based on the second instruction.

Based on this possible implementation, the user can perform an operation on the interface of the first electronic device to trigger the first electronic device to establish a connection with the second electronic device, which does not require the user to perform operations on the second electronic device, thereby reducing operations of the user on the second electronic device.

With reference to the third aspect, in another possible implementation, the second connection instruction further includes a modified device name of the second electronic device. Before the second electronic device sends the second connection instruction to the third electronic device, the data transmission method may further include: the second electronic device modifies a device name of the second electronic device.

Based on this possible implementation, the second connection instruction includes the name of the second electronic device that is modified by the second electronic device, the third electronic device can connect to the second electronic device based on the modified name of the second electronic device, and the user does not need to select a device that needs to be connected. This can further reduce user operations.

With reference to the third aspect, in another possible implementation, the first electronic device is a computer, the second electronic device is a mobile phone, and the third electronic device is a wearable electronic device.

Based on this possible implementation, after the instruction channel between the computer and the wearable electronic device is established through the mobile phone, the computer can send an instruction to the wearable electronic device through the mobile phone, and after receiving the instruction sent by the computer, the wearable electronic device can send the relevant data to the computer through the mobile phone, so that the user can view the internally stored file of the wearable electronic device on the computer, which is convenient for the user.

According to a fourth aspect, an embodiment of this application provides a data transmission method applied to a third electronic device. The data transmission method may include: The third electronic device establishes a connection with a second electronic device; and the third electronic device sends first data to the second electronic device through the established connection, so that the second electronic device forwards the first data to a first electronic device.

According to the method in the fourth aspect, an instruction channel is established between the first electronic device and the third electronic device through the second electronic device, so that the third electronic device can send the first data to the first electronic device through the second electronic device, and the first electronic device can display the data sent by the third electronic device. That is, the third electronic device can send the first data directly to the first electronic device through the second electronic device, and the second electronic device forwards the first data sent by the third electronic device without first storing the first data into the second electronic device and then sending the first data stored in the second electronic device to the first electronic device. Therefore, this can simplify the process in which the user views data of the third electronic device on the first electronic device.

With reference to the fourth aspect, in another possible implementation, that the third electronic device establishes a connection with a second electronic device may include: the third electronic device receives a second connection instruction sent by the second electronic device, where the second connection instruction is a connection instruction sent by the second electronic device to the third electronic device in response to a first connection instruction sent by the first electronic device, and the first connection instruction is used for instructing the second electronic device to establish a connection with the third electronic device.

Based on this possible implementation, the third electronic device can establish a connection with the second electronic device according to the connection instruction sent by the second electronic device, without requiring the user to perform operations on the second electronic device and the third electronic device, thereby reducing user operations.

With reference to the fourth aspect, in another possible implementation, that the third electronic device establishes a connection with the second electronic device in response to the second connection instruction may include: when the second connection instruction includes a first identifier, the third electronic device automatically establishes a connection with the second electronic device, where the first identifier is used for instructing the third electronic device to automatically establish a connection with the second electronic device.

According to the method in the fourth aspect, the second connection instruction includes the first identifier that instructs the third electronic device to automatically establish a connection with the second electronic device. When the third electronic device determines that the second connection instruction includes the first identifier, the third electronic device can automatically establish a connection with the second electronic device, and the user does not need to perform confirmation on the third electronic device. This can reduce user operations.

With reference to the fourth aspect, in another possible implementation, before the third electronic device sends, through the established connection, the first data to the second electronic device, the data transmission method may further include: the third electronic device receives an obtaining instruction forwarded by the second electronic device, where the obtaining instruction is sent by the first electronic device to the second electronic device, and the obtaining instruction includes an identifier of the first data.

Based on this possible implementation, after the instruction channel is established between the first electronic device and the third electronic device through the second electronic device, the first electronic device may send an instruction to the third electronic device through the second electronic device. After the third electronic device receives the instruction sent by the first electronic device, the third electronic device may send relevant data to the first electronic device through the second electronic device, so that the user can view the internally stored file of the third electronic device on the first electronic device, which is convenient for the user to use.

With reference to the fourth aspect, in another possible implementation, the second connection instruction further includes a modified device name of the second electronic device.

Based on this possible implementation, the second connection instruction includes the name of the second electronic device that is modified by the second electronic device, the third electronic device can connect to the second electronic device based on the modified name of the second electronic device, and the user does not need to select a device that needs to be connected. This can further reduce user operations.

With reference to the fourth aspect, in another possible implementation, the first electronic device is a computer, the second electronic device is a mobile phone, and the third electronic device is a wearable electronic device.

Based on this possible implementation, after the instruction channel between the computer and the wearable electronic device is established through the mobile phone, the computer can send an instruction to the wearable electronic device through the mobile phone, and after receiving the instruction sent by the computer, the wearable electronic device can send the relevant data to the computer through the mobile phone, so that the user can view the internally stored file of the wearable electronic device on the computer, which is convenient for the user.

According to a fifth aspect, an embodiment of this application provides a data transmission apparatus, and the display apparatus may be applied to a first electronic device to implement the method in the second aspect. Functions of the display apparatus may be implemented by using hardware or may be implemented by using hardware executing corresponding software. The hardware or the software includes one or more modules corresponding to the foregoing functions, for example, a receiving module and a display module.

The receiving module may be configured to receive first data forwarded by the second electronic device. The first data is data sent by a third electronic device to the second electronic device through a connection established between the third electronic device and the second electronic device.

The display module may be configured to display the first data. With reference to the fifth aspect, in another possible implementation, the data transmission apparatus may further include a sending module. The sending module may be configured to send a first connection instruction to the second electronic device, where the first connection instruction is used to instruct the second electronic device to establish a connection with the third electronic device.

With reference to the fifth aspect, in another possible implementation, the sending module may be further configured to send a scan instruction to the second electronic device, where the scan instruction is used to instruct the second electronic device to scan for a connectable electronic device.

The receiving module may be configured to receive first indication information sent by the second electronic device. The first indication information is used for indicating a connectable electronic device detected by the second electronic device through scanning. The connectable electronic device includes the third electronic device.

With reference to the fifth aspect, in another possible implementation, the display module may further be configured to display the connectable electronic device, where the connectable electronic device includes the third electronic device. The receiving module may be further configured to receive a second operation performed by a user on the third electronic device.

With reference to the fifth aspect, in another possible implementation, the first connection instruction includes an identifier of the third electronic device.

With reference to the fifth aspect, in another possible implementation, the receiving module may be further configured to receive a third operation performed by the user on a second control.

The sending module may be further configured to send an obtaining instruction to the second electronic device in response to the third operation, where the obtaining instruction includes an identifier of the first data.

With reference to the fifth aspect, in another possible implementation, the display module may be further configured to display the first data in a preset manner based on a type of the first data.

With reference to the fifth aspect, in another possible implementation, the sending module may be further configured to send a first instruction to the second electronic device, where the first instruction is used to instruct the second electronic device to establish a connection between a port of the second electronic device and a port of the first electronic device.

The sending module may be further configured to send a second instruction to the second electronic device, where the second instruction is used to instruct the second electronic device to enable a service corresponding to a first application. The first application is used for scanning for a connectable electronic device.

The above data transmission apparatus may further include an establishment module. The establishment module may be configured to establish a socket.

With reference to the fifth aspect, in another possible implementation, the first electronic device is a computer, the second electronic device is a mobile phone, and the third electronic device is a wearable electronic device.

According to a sixth aspect, an embodiment of this application provides a data transmission apparatus, and the display apparatus may be applied to a second electronic device to implement the method in the third aspect. Functions of the display apparatus may be implemented by using hardware or may be implemented by using hardware executing corresponding software. The hardware or the software includes one or more modules corresponding to the foregoing functions, for example, a connection module, a receiving module, and a sending module. The connection module may be configured to establish a connection with a third electronic device.

The receiving module may be configured to receive, through the established connection, first data sent by the third electronic device.

The sending module may be configured to forward the first data to the first electronic device.

With reference to the sixth aspect, in another possible implementation, the receiving module may be further configured to receive a first connection instruction sent by the first electronic device, where the first connection instruction is used to indicate the second electronic device to establish a connection with the third electronic device.

The connection module may be further configured to establish a connection with the third electronic device in response to the first connection instruction received.

With reference to the sixth aspect, in another possible implementation, the receiving module may be further configured to receive a scan instruction sent by the first electronic device, where the scan instruction is used to instruct the second electronic device to scan for a connectable electronic device.

The sending module may be configured to: when the second electronic device detects a connectable electronic device through scanning, send first indication information to the first electronic device, where the first indication information is used to indicate the connectable electronic device detected by the second electronic device through scanning. The connectable electronic device includes the third electronic device.

With reference to the sixth aspect, in another possible implementation, the sending module may be further configured to send a second connection instruction to the third electronic device based on the first connection instruction received, where the second connection instruction is used to instruct the third electronic device to establish a connection with the second electronic device, so that the third electronic device establishes a connection with the second electronic device in response to the second connection instruction received.

With reference to the sixth aspect, in another possible implementation, the first connection instruction includes an identifier of the third electronic device.

With reference to the sixth aspect, in another possible implementation, the second connection instruction includes a first identifier, and the first identifier is used to instruct the third electronic device to automatically establish a connection with the second electronic device.

With reference to the sixth aspect, in another possible implementation, the receiving module may be further configured to receive an obtaining instruction sent by the first electronic device, where the obtaining instruction includes an identifier of the first data.

The sending module may be further configured to forward the obtaining instruction to the third electronic device.

With reference to the sixth aspect, in another possible implementation, the receiving module may be further configured to receive a first instruction sent by the first electronic device, where the first instruction is used to instruct the second electronic device to establish a connection between a port of the second electronic device and a port of the first electronic device.

The above data transmission apparatus may further include an establishment module and an enabling module. The establishment module may be configured to establish a connection between the port of the second electronic device and the port of the first electronic device based on the first instruction.

The receiving module may be further configured to receive a second instruction sent by the first electronic device, where the second instruction is used to instruct the second electronic device to enable a service corresponding to a first application. The first application is used for scanning for a connectable electronic device.

The enabling module may be configured to enable the service corresponding to the first application based on the second instruction.

With reference to the sixth aspect, in another possible implementation, the second connection instruction further includes a modified device name of the second electronic device. The above data transmission apparatus may further include a modification module. The modification module may be configured to modify a device name of the second electronic device.

With reference to the sixth aspect, in another possible implementation, the first electronic device is a computer, the second electronic device is a mobile phone, and the third electronic device is a wearable electronic device.

According to a seventh aspect, an embodiment of this application provides a data transmission apparatus, and the display apparatus may be applied to a third electronic device to implement the method in the fourth aspect. Functions of the display apparatus may be implemented by using hardware or may be implemented by using hardware executing corresponding software. The hardware or the software includes one or more modules corresponding to the foregoing functions, for example, a connection module and a sending module.

The connection module may be configured to establish a connection with a second electronic device.

The sending module may be configured to send first data to the second electronic device through the established connection, so that the second electronic device forwards the first data to a first electronic device.

With reference to the seventh aspect, in another possible implementation, the data transmission apparatus may further include a receiving module. The receiving module may be configured to receive a second connection instruction sent by the second electronic device. The second connection instruction is a connection instruction sent by the second electronic device to the third electronic device in response to a first connection instruction sent by the first electronic device. The first connection instruction is used for instructing the second electronic device to establish a connection with the third electronic device.

The connection module may be further configured to establish a connection with the second electronic device in response to the second connection instruction.

With reference to the seventh aspect, in another possible implementation, the connection module may be further configured to automatically establish a connection with the second electronic device when the second connection instruction includes a first identifier. The first identifier is used for instructing the third electronic device to automatically establish a connection with the second electronic device.

With reference to the seventh aspect, in another possible implementation, the receiving module may be further configured to receive an obtaining instruction forwarded by the second electronic device. The obtaining instruction is sent by the first electronic device to the second electronic device. The obtaining instruction includes an identifier of the first data.

With reference to the seventh aspect, in another possible implementation, the second connection instruction further includes a modified device name of the second electronic device.

With reference to the seventh aspect, in another possible implementation, the first electronic device is a computer, the second electronic device is a mobile phone, and the third electronic device is a wearable electronic device.

In an eighth aspect, an embodiment of this application provides an electronic device, including: a processor, and a memory configured to store instructions that can be executed by the processor. The processor is configured to, when executing the instructions, enable the electronic device to implement the data transmission method according to any one of the second aspect or the possible implementations of the second aspect. Alternatively, the processor is configured to, when executing the instructions, enable the electronic device to implement the data transmission method according to any one of the third aspect or the possible implementations of the third aspect. Alternatively, the processor is configured to, when executing the instructions, enable the electronic device to implement the data transmission method according to any one of the fourth aspect or the possible implementations of the fourth aspect.

According to a ninth aspect, an embodiment of this application provides a computer-readable storage medium, storing computer program instructions. The computer program instructions, when executed by an electronic device, enable the electronic device to implement the data transmission method according to any one of the second aspect or the possible implementations of the second aspect. Alternatively, the computer program instructions, when executed by an electronic device, enable the electronic device to implement the data transmission method according to any one of the third aspect or the possible implementations of the third aspect. Alternatively, the computer program instructions, when executed by an electronic device, enable the electronic device to implement the data transmission method according to any one of the fourth aspect or the possible implementations of the fourth aspect.

According to a tenth aspect, an embodiment of this application provides a computer program product, including computer-readable code, where the computer-readable code, when executed in an electronic device, enables the electronic device to implement the data transmission method according to any one of the second aspect or the possible implementations of the second aspect. Alternatively, the computer-readable code, when executed in an electronic device, enables the electronic device to implement the data transmission method according to any one of the third aspect or the possible implementations of the third aspect. Alternatively, the computer-readable code, when executed in an electronic device, enables the electronic device to implement the data transmission method according to any one of the fourth aspect or the possible implementations of the fourth aspect.

According to an eleventh aspect, an embodiment of this application provides a data transmission system, and the data transmission system may include: a first electronic device, a second electronic device connected to the first electronic device, and a third electronic device. The first electronic device may be configured to execute the data transmission method according to any one of the second aspect or the possible implementations of the second aspect. The second electronic device may be configured to execute the data transmission method according to any one of the third aspect or the possible implementations of the third aspect. The third electronic device may be configured to execute the data transmission method according to any one of the fourth aspect or the possible implementations of the fourth aspect. It should be understood that, for beneficial effects of the fifth aspect to the eleventh aspect, reference may be made to the related description in the first aspect, the second aspect, the third aspect, or the fourth aspect. Details are not described herein again.

DESCRIPTION OF EMBODIMENTS

Figure 1:
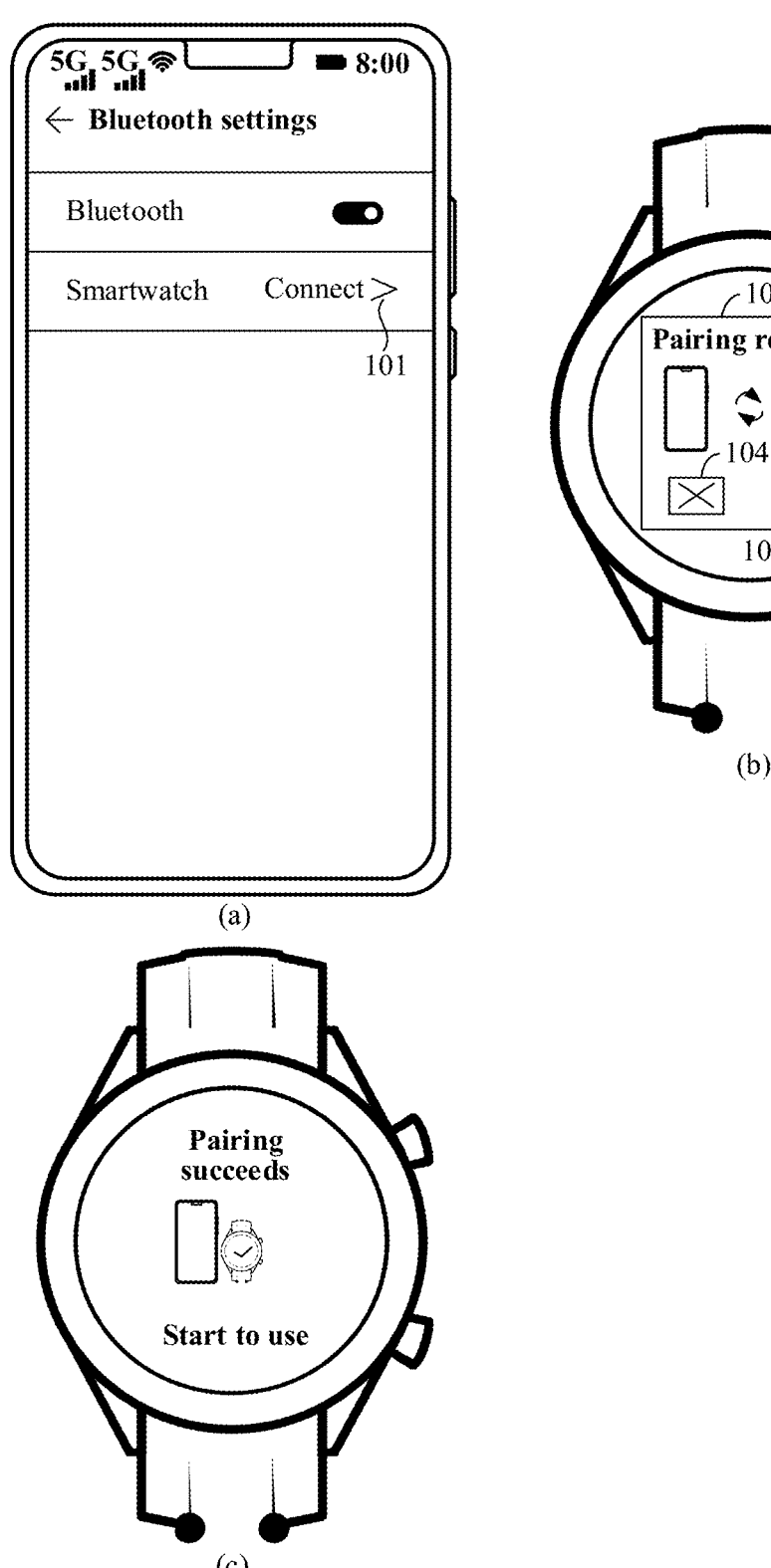
FIG. 1 is a schematic diagram of a display interface of an electronic device according to an embodiment of this application.

The technical solutions in embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

Terms "first" and "second" are merely used for description purposes, and shall not be understood as an indication or implication of relative importance or implicitly indicate the number of indicated technical features. Therefore, a feature defined as "first" or "second" may explicitly or implicitly include one or more of the features. In the description of this application, unless otherwise stated, "a plurality of" means two or more than two.

With the popularity of smart devices and the development of communication technologies, smart wearable devices (such as smartwatches) have increasing functions. For example, a smartwatch not only includes a basic function of checking time, the smartwatch can further include heart rate and blood oxygen monitoring functions, and the smartwatch can further include a payment function, a call function, and the like.

Smart wearable devices, such as smartwatches, are becoming increasingly popular among users as people are increasingly focused on health monitoring and intelligence experience. For example, a user can use a smartwatch to check the time, and the user can further use the smartwatch to monitor the user's health or use the smartwatch to play music and the like. In a process of using the smartwatch, the smartwatch generates a relevant file. For example, when the user wears the smartwatch for exercise, the smartwatch generates a sports record file; when the user uses the smartwatch for health monitoring, the smartwatch generates health data, such as the user's heart rate, blood oxygen and other data; or when the user uses the smartwatch, the smartwatch generates a file such as a maintenance log.

However, these relevant files are usually saved inside the smartwatch and cannot be sent directly to the computer, which makes it impossible for users to view the files saved inside the smartwatch directly on the computer or manage the files saved inside the smartwatch through the computer. This is not convenient for users and R&D personnel.

In a related technology, a user can use a mobile phone to establish a connection with a smartwatch. After the connection is established between the mobile phone and the smartwatch, the user can perform operations on the mobile phone so that the mobile phone can send an instruction to the smartwatch via Bluetooth communication tools such as serial port profile (serial port profile, SPP). After the smartwatch receives the instruction sent by the mobile phone, the smartwatch can send the relevant files stored internally to the mobile phone, that is, the smartwatch can export the relevant files stored internally to the mobile phone. After the relevant files stored inside the smartwatch are exported to the mobile phone, the user can use the mobile phone to establish a connection with a computer. After the connection between the mobile phone and the computer is established, the user can perform operations on the computer, so that the computer can export relevant files inside the smartwatch that are stored in the mobile phone to the computer. After the relevant files inside the smartwatch are exported to the computer, the user can view the relevant files saved inside the smartwatch on the computer, and then the user can manage the relevant files.

However, in a related technology, when the user needs to view the relevant files on the computer, the user needs to send the relevant files stored in the smartwatch to the mobile phone first, so that the mobile phone saves the relevant files stored in the smartwatch. Then, the user operates the mobile phone, to send the relevant files stored in the mobile phone to the computer. Therefore, the process in which the user views the relevant files on the computer is complicated.

In addition, in the related technology, when the smartwatch exports the relevant files stored internally to the mobile phone, the user is required to perform operations on the mobile phone in order to send the relevant files stored in the smartwatch to the mobile phone. In addition, when the mobile phone exports the relevant files inside the smartwatch to the computer, it also requires the user to perform operations on the computer in order to export the relevant files of the smartwatch that are stored in the mobile phone to the computer, which leads to more operations for the user, and results in poor experience of the user. Therefore, the problem of the user not being able to view the relevant files saved inside the smartwatch directly on the computer is not well resolved in the current technology.

In addition, the connection established between the mobile phone and the smartwatch in this related technology is usually a Bluetooth connection. When establishing a Bluetooth connection between the mobile phone and the smartwatch, it requires the user to perform operations on both the mobile phone and the smartwatch, to successfully establish a Bluetooth connection between the mobile phone and the smartwatch, which further leads to more operations and poor user experience.

For example, when the user needs to establish a Bluetooth connection between the mobile phone and the smartwatch, the user can turn on a Bluetooth function on the mobile phone, and the mobile phone can discover a Bluetooth device around the mobile phone, such as the smartwatch, and display the discovered smartwatch, so that the user can select the smartwatch that needs to be connected. As shown in (a) in FIG. 1, when the mobile phone finds the presence of a connectable Bluetooth device, such as a smartwatch, around the mobile phone, the mobile phone can display a selection control corresponding to the connectable Bluetooth device, that is, a selection control 101 corresponding to the smartwatch. When the user needs to establish a connection between the mobile phone and the smartwatch, the user may trigger the selection control 101 corresponding to the smartwatch. That is, the mobile phone may send a connection request to the smartwatch when the mobile phone receives a trigger operation, such as a tap operation, from the user for the corresponding selection control 101 of the smartwatch.

When the smartwatch receives the connection request from the mobile phone, as shown in (b) of FIG. 1, the smartwatch may display a prompt window 102, which may include the words "Pairing request". The prompt window 102 may further include two options, that is, an "Agree" option 103 and a "Decline" option 104. When the smartwatch receives a trigger operation from the user, such as a tap operation, on the "Agree" option 103 in the prompt window 102, the smartwatch may determine that the user agrees to establish a connection, so that the smartwatch can establish a Bluetooth connection with the mobile phone, that is, the smartwatch is paired with the mobile phone. When the smartwatch can establish the Bluetooth connection with the mobile phone, that is, the smartwatch is paired with the mobile phone, as shown in (c) in FIG. 1, the smartwatch can display successful pairing, thus indicating to the user that the mobile phone and the smartwatch have been paired successfully.

When the smartwatch receives a trigger operation from the user, such as a tap operation, for the "Decline" option 104 in the prompt window 102, the smartwatch can determine that the user refuses to establish a connection, so that the smartwatch can refuse to establish a Bluetooth connection with the mobile phone. Therefore, when a Bluetooth connection needs to be established between the mobile phone and the smartwatch, it requires the user to perform operations on both the mobile phone and the smartwatch, to successfully establish a Bluetooth connection between the mobile phone and the smartwatch, which further leads to more operations for the user.

In view of the above problems, embodiments of this application provide a data transmission method applied to a data transmission system, which can include a first electronic device (such as a notebook computer), a second electronic device (such as a mobile phone), and a third electronic device (such as a smartwatch). According to the data transmission method, an instruction channel can be established between the first electronic device and the third electronic device through the second electronic device, so that the third electronic device can send first data to the first electronic device through the second electronic device, and the first electronic device can display the data sent by the third electronic device. That is, the third electronic device can send the first data directly to the first electronic device through the second electronic device, and the second electronic device forwards the first data sent by the third electronic device without first storing the first data into the second electronic device and then sending the first data stored in the second electronic device to the first electronic device. Therefore, this can simplify the process in which the user views data of the third electronic device on the first electronic device.

In addition, in the solution of this application, since the instruction channel between the first electronic device and the third electronic device is established through the second electronic device, the first electronic device can send an instruction to the third electronic device through the instruction channel (that is, the second electronic device), and the third electronic device can send a relevant document to the first electronic device through the instruction channel (that is, the second electronic device). In other words, in the solution of this application, the user does not need to perform an operation on the second electronic device when the third electronic device exports the relevant files stored internally to the second electronic device, which can reduce the user's operations and thus improve user experience.

In addition, the solution of this application does not require the user to perform operations on the second electronic device and the third electronic device when establishing the instruction channel between the first electronic device and the third electronic device through the second electronic device. This can reduce the user's operations and further facilitate the user's use.

Figure 2:
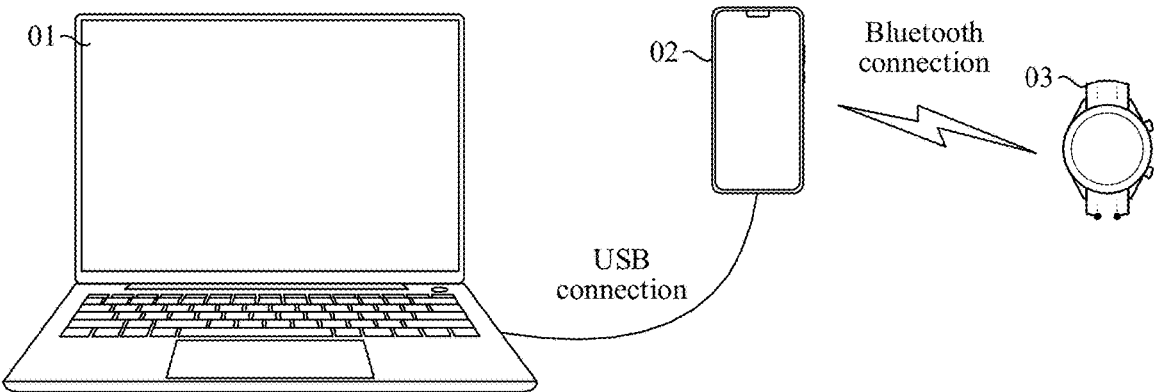
FIG. 2 is a schematic diagram of a data transmission system according to an embodiment of this application.

For example, the first electronic device is a notebook computer, the second electronic device is a mobile phone, and the third electronic device is a smartwatch. As shown in FIG. 2, the data transmission system includes a notebook computer 01, a mobile phone 02, and a smartwatch 03. A connection between the notebook computer 01 and the mobile phone 02 may be established through a universal serial bus (universal serial bus, USB), that is, USB communication may be performed between the notebook computer 01 and the mobile phone 02. The connection between the mobile phone 02 and the smartwatch 03 may be established through Bluetooth, that is, Bluetooth communication may be performed between the mobile phone 02 and the smartwatch 03.

Figure 3:
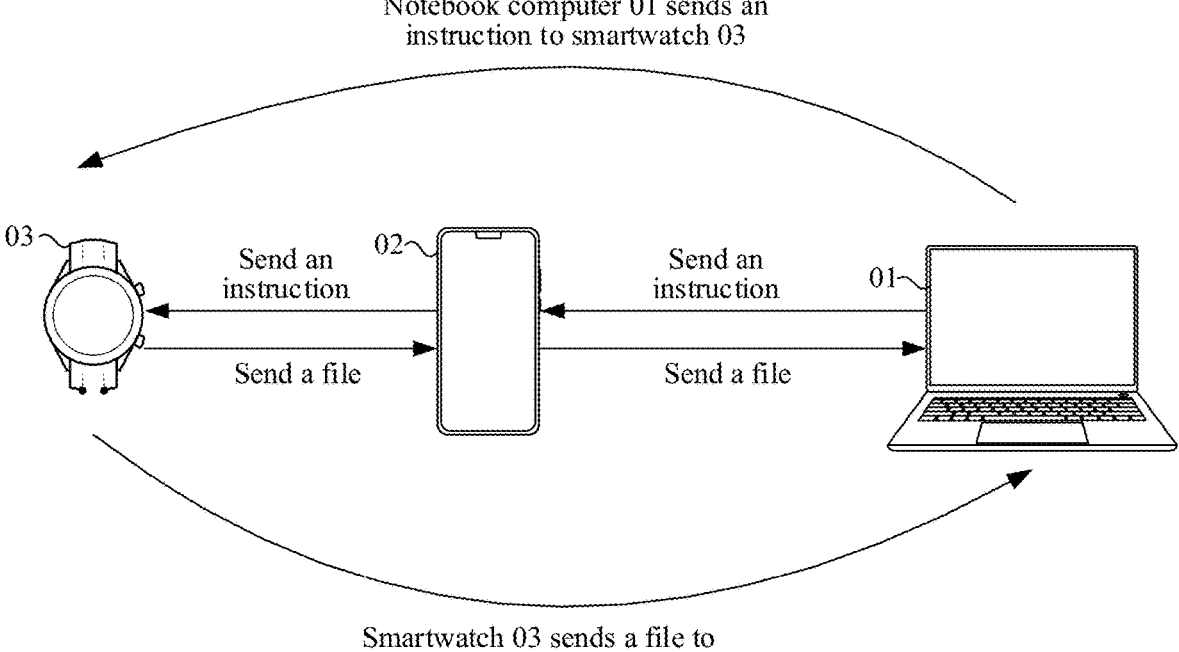
FIG. 3 is a schematic diagram of a principle of a data transmission method according to an embodiment of this application.

After the connection is established between the notebook computer 01 and the mobile phone 02 through USB and the connection is established between the mobile phone 02 and the smartwatch 03 through Bluetooth, that is, after the notebook computer 01 establishes an instruction channel with the smartwatch 03 through the mobile phone 02, as shown in FIG. 3, the notebook computer 01 can send an instruction, such as an instruction for obtaining a relevant file stored in the smartwatch 03, to the mobile phone 02. After the mobile phone 02 receives the instruction sent from the notebook computer 01, the mobile phone 02 may send the instruction to the smartwatch 03. That is, the notebook computer 01 can send an instruction to the smartwatch 03 via the mobile phone 02. After the smartwatch 03 receives the instruction sent by the mobile phone 02, the smartwatch 03 may send a file corresponding to the instruction to the mobile phone 02. After the mobile phone 02 receives the file sent by the smartwatch 03, the mobile phone 02 may send the file to the notebook computer 01. After the notebook computer 01 receives the file sent by the mobile phone 02, the notebook computer 01 may display the file. That is, the smartwatch 03 can send a file (which may also be referred to as data) to the notebook computer 01 via the mobile phone 02.

After the notebook computer 01 displays the file saved inside this smartwatch 03, the user can view the file saved inside the smartwatch 03 on the notebook computer 01, and the user can manage the file saved inside the smartwatch 03 on the notebook computer 01. That is, the smartwatch 03 can send the file saved inside the smartwatch 03 to the notebook computer 01 via the mobile phone 02, so that the notebook computer 01 can display the file saved inside the smartwatch 03, and may further manage the file saved inside the smartwatch 03 for convenience of the user.

In addition, since the instruction channel between the notebook computer 01 and the smartwatch 03 is established through the mobile phone 02, the notebook computer 01 can send an instruction to the smartwatch 03 through the instruction channel (that is, the mobile phone 02), and the smartwatch 03 can send a related file to the notebook computer 01 through the instruction channel (that is, the mobile phone 02). In other words, when the mobile phone 02 forwards the relevant file stored inside the smartwatch 03, it does not require the user to perform an operation on the mobile phone 02. This can reduce the user's operations and improve user experience.

In addition, in a process of establishing the instruction channel between the notebook computer 01 and the smartwatch 03 through the mobile phone 02, the user does not need to perform operations on the mobile phone 02 and the smartwatch 03. This can reduce the user's operations and further facilitate the user's use.

In some examples, the first electronic device may be an electronic device such as a notebook computer, a tablet computer, a handheld computer, a PC, a personal digital assistant (personal digital assistant, PDA), or the like. A specific form of the electronic device is not limited in embodiments of this application. In embodiments of this application, description is made by using an example in which the first electronic device is a notebook computer.

Figure 4:
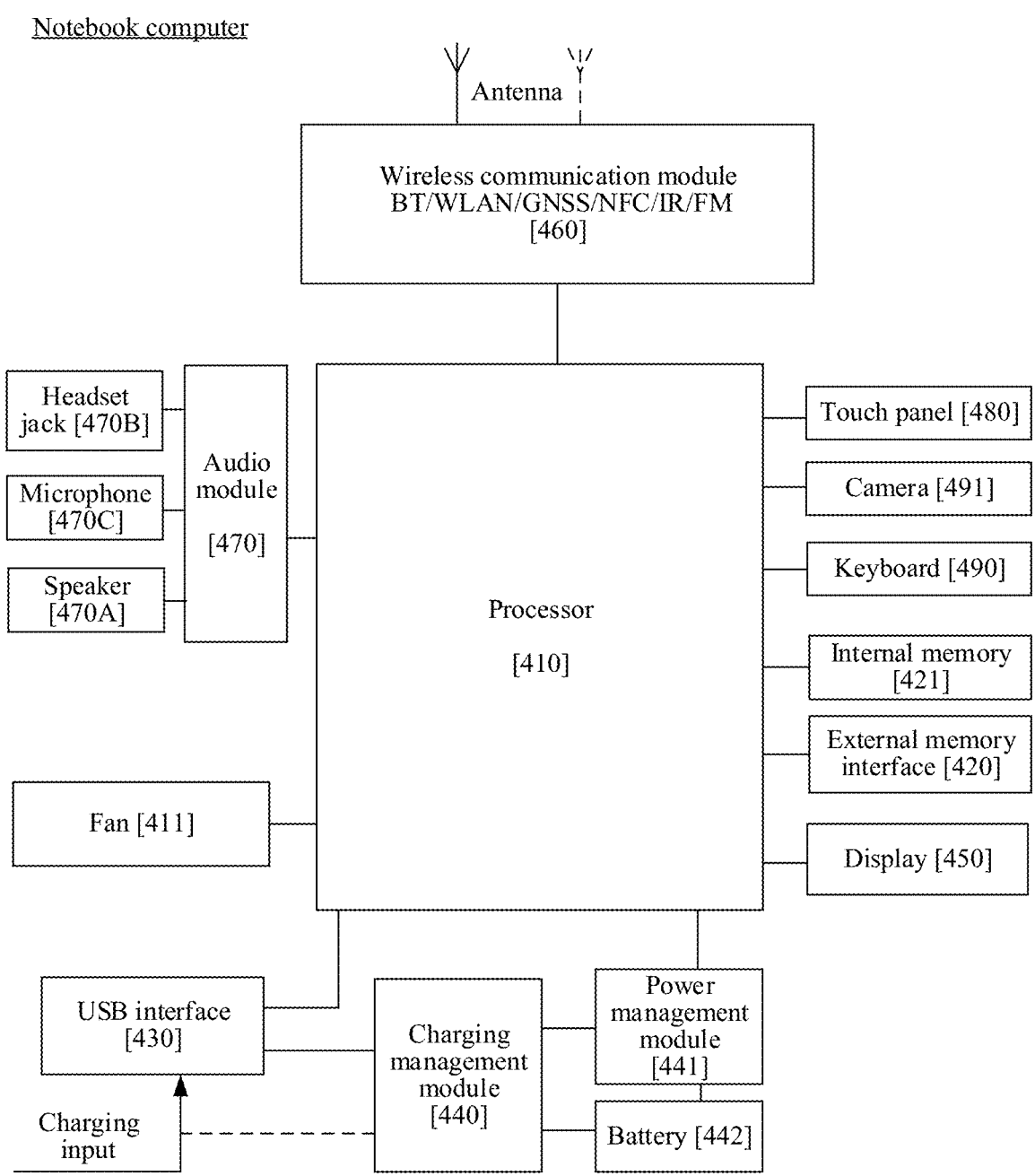
FIG. 4 is a schematic diagram 1 of a hardware structure of an electronic device according to an embodiment of this application.

For example, the first electronic device being a notebook computer is used as an example. FIG. 4 is a schematic diagram of a structure of the first electronic device according to an embodiment of this application.

As shown in FIG. 4, the notebook computer may include: a processor 410, a fan 411, an external memory interface 420, an internal memory 421, a USB interface 430, a charging management module 440, a power management module 441, a battery 442, a display 450, an antenna, a wireless communication module 460, an audio module 470, a speaker (a horn) 470A, a microphone 470C, a headset jack 470B, a touch panel 480, a keyboard 490, a camera 491, and the like.

The foregoing devices other than the display 450 (for example, the processor 410, the fan 411, the external memory interface 420, the internal memory 421, the USB interface 430, the charging management module 440, the power management module 441, the battery 442, the antenna, the wireless communication module 460, the audio module 470, the touch panel 480, the speaker 470A, the microphone 470C, the headset jack 470B, the keyboard 490, and the camera 491) can be disposed on a base of the notebook computer. The above camera 491 may also be provided on a bezel of the display 450 of the notebook computer.

It may be understood that the structure shown in this embodiment does not constitute a specific limitation on the notebook computer. In other embodiments, the notebook computer may include more or fewer components than those shown in the figure, or some components may be combined, or some components may be split, or components are arranged in different manners. The components in the figure may be implemented by hardware, software or a combination of software and hardware.

The processor 410 may include one or more processing units, for example, the processor 410 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be independent components, or may be integrated into one or more processors.

The controller may be a neural center and command center of the notebook computer. The controller may generate an operation control signal based on an instruction operation code and a time sequence signal, to complete control of instruction reading and instruction execution.

A memory may be further disposed in the processor 410, and is configured to store instructions and data. In some embodiments, the memory in the processor 410 is a cache memory. The memory may store an instruction or data that has been used or cyclically used by the processor 410. If the processor 410 needs to use the instruction or the data again, the processor may directly invoke the instruction or the data from the memory, this avoids repeated access, reduces waiting time of the processor 410, and improves system efficiency.

In some embodiments, the processor 410 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that a schematic interface connection relationship between the modules in this embodiment is merely an example for description, and constitutes no limitation on the structure of the notebook computer. In some other embodiments, the notebook computer may also adopt an interface connection manner different from that in the foregoing embodiment, or adopt a combination of a plurality of interface connection manners.

The notebook computer may implement a display function by using the GPU, the display 450, the application processor, and the like. The GPU is a microprocessor for image processing, and connects the display 450 and the application processor. The GPU is configured to perform mathematical and geometrical calculation, and is configured to perform graphics rendering. The processor 410 may include one or more GPUs that execute program instructions to generate or change display information. The display 450 is configured to display an image, a video, and the like. The display 450 in embodiments of this application can be used for displaying display interfaces corresponding to web pages for viewing and managing the smartwatch as shown in FIG. 8-FIG. 10, FIG. 13, and FIG. 14.

The external memory interface 420 may be configured to connect to an external memory card, for example, a micro SD card, to extend a storage capability of the notebook computer. The internal memory 421 may be configured to store computer-executable program code, where the computer-executable program code includes instructions. The processor 410 executes various functional applications of the notebook computer and data processing by running instructions stored in the internal memory 421. For example, in this embodiment of this application, the processor 310 can execute instructions stored in the internal memory 421. The internal memory 421 may include a program storage area and a data storage area.

Certainly, it may be understood that, FIG. 4 only shows an exemplary description when the form of the electronic device is a notebook computer. If the electronic device is in another device form such as a handheld computer, a PDA, or a personal computer, the structure of the electronic device may include fewer structures than those shown in FIG. 4 or may include more structures than those shown in FIG. 4. This is not limited herein.

In some examples, the second electronic device may be an electronic device such as a mobile phone, a tablet computer, a handheld computer, a personal computer PC, a cellular phone, a PDA, or a wearable device. In embodiments of this application, description is made by using an example in which the second electronic device is a mobile phone.

Figure 5:
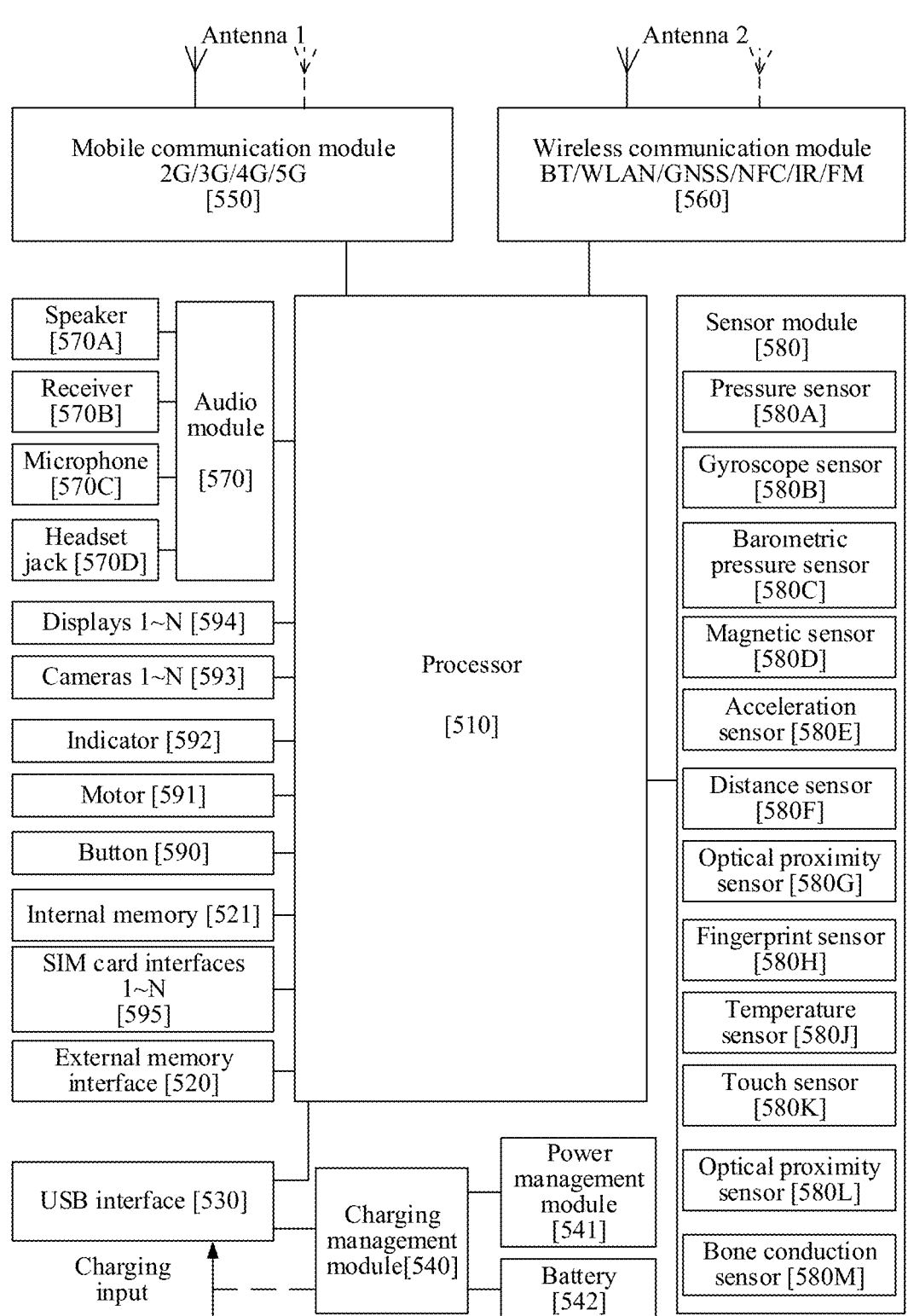
FIG. 5 is a schematic diagram 2 of a hardware structure of an electronic device according to an embodiment of this application.

For example, the second electronic device being a mobile phone is used as an example. FIG. 5 is a schematic diagram of a structure of the second electronic device according to an embodiment of this application.

As shown in FIG. 5, the electronic device may include a processor 510, an external memory interface 520, an internal memory 521, a USB interface 530, a charging management module 540, a power management module 541, a battery 542, an antenna 1, an antenna 2, a mobile communication module 550, a wireless communication module 560, an audio module 570, a speaker 570A, a receiver 570B, a microphone 570C, a headset jack 570D, a sensor module 580, a button 590, a motor 591, an indicator 592, a camera 593, a display 594, an SIM card interface 595, and the like. The sensor module 580 may include a pressure sensor 580A, a gyroscope sensor 580B, a barometric pressure sensor 580C, a magnetic sensor 580D, an acceleration sensor 580E, a distance sensor 580F, an optical proximity sensor 580G, a fingerprint sensor 580H, a temperature sensor 580J, a touch sensor 580K, an ambient light sensor 580L, and a bone conduction sensor 580M.

It may be understood that the schematic structure in this embodiment constitutes no specific limitation on the electronic device. In other embodiments, the electronic device may include more or fewer components than those shown in the figure, or some components may be combined, or some components may be split, or components are arranged in different manners. The components in the figure may be implemented by hardware, software or a combination of software and hardware.

The processor 510 may include one or more processing units, for example, the processor 510 may include an application processor AP, a modem processor, a graphics processing unit GPU, an image signal processor ISP, a controller, a memory, a video codec, a digital signal processor DSP, a baseband processor, and/or a neural-network processing unit NPU, and the like. Different processing units may be independent components, or may be integrated into one or more processors.

The controller may be a nerve center and a command center of the electronic device. The controller may generate an operation control signal based on an instruction operation code and a time sequence signal, to complete control of instruction reading and instruction execution.

A memory may be further disposed in the processor 510, and is configured to store instructions and data. In some embodiments, the memory in the processor 510 is a cache memory. The memory may store an instruction or data that has been used or cyclically used by the processor 510. If the processor 510 needs to use the instruction or data again, the instruction or data may be directly invoked from the memory. This avoids repeated access, reduces waiting time of the processor 510, and improves system efficiency.

In some embodiments, the processor 510 may include one or more interfaces. The interfaces may include an integrated circuit I2C interface, an integrated circuit built-in audio I2S interface, a pulse code modulation PCM interface, a universal asynchronous receiver/transmitter UART interface, a mobile industry processor interface MIPI, a general purpose input/output GPIO interface, a subscriber identification module SIM interface, a universal serial bus USB interface, and/or the like.

The electronic device implements a display function through the GPU, the display 594, the application processor, and the like. The GPU is a microprocessor for image processing, and connects the display 594 and the application processor. The GPU is configured to perform mathematical and geometrical calculation, and is configured to perform graphics rendering. The processor 510 may include one or more GPUs that execute program instructions to generate or change display information.

In the embodiments of this application, the display 594 may be configured to display an interface of the electronic device.

Certainly, it may be understood that, FIG. 5 only shows an exemplary description when the form of the electronic device is a mobile phone. If the electronic device is in another device form such as a tablet computer, a handheld computer, a PC, a PDA, or a wearable device (for example, a smartwatch or a smart band), the structure of the electronic device may include fewer structures than those shown in FIG. 5 or may include more structures than those shown in FIG. 5. This is not limited herein.

The third electronic device may be a smart wearable device, for example, a smartwatch, a smart band, smart glasses, or the like. In embodiments of this application, description is made by using an example in which the third electronic device is a smartwatch.

Figure 6:
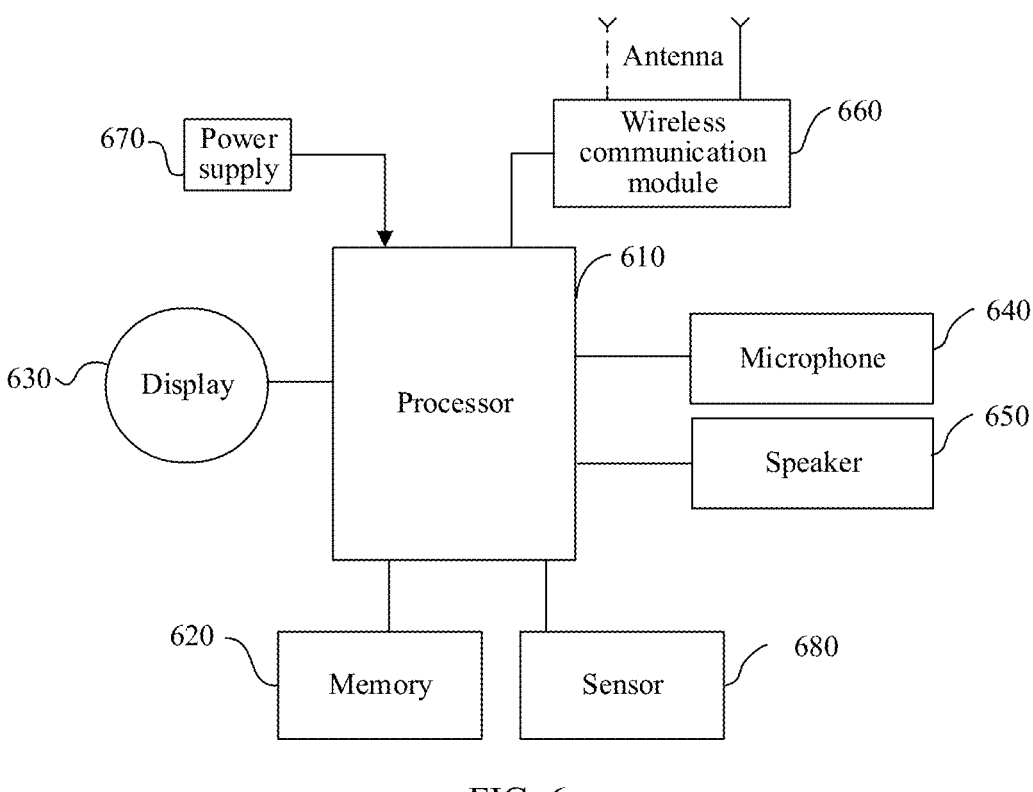
FIG. 6 is a schematic diagram 3 of a hardware structure of an electronic device according to an embodiment of this application.

For example, the third electronic device being a smartwatch is used as an example. FIG. 6 is a schematic diagram of a structure of the third electronic device according to an embodiment of this application.

As shown in FIG. 6, the smartwatch may include components such as a processor 610, a memory 620, a display 630, a microphone 640, a speaker 650, a wireless communication module 660, an antenna, a power supply 670, and a sensor 680.

The processor 610 may include one or more processing units, for example, the processor 610 may include an application processor AP, a modem processor, a graphics processing unit GPU, an image signal processor ISP, a controller, a memory, a video codec, a digital signal processor DSP, a baseband processor, and/or a neural-network processing unit NPU, and the like. Different processing units may be independent devices, or may be integrated into one processor.

A memory may be further disposed in the processor 610, and is configured to store instructions and data. In some embodiments, the memory in the processor is a cache memory. The memory may store instructions or data recently used or cyclically used by the processor. If the processor needs to use the instructions or data again, the instructions or data may be directly invoked from the memory. This avoids repeated access, reduces waiting time of the processor, and improves system efficiency.

In some embodiments, the processor 610 may include one or more interfaces. The interfaces may include an integrated circuit I2C interface, an integrated circuit built-in audio I2S interface, a pulse code modulation PCM interface, a universal asynchronous receiver/transmitter UART interface, a mobile industry processor interface MIPI, a general purpose input/output GPIO interface, a subscriber identification module SIM interface, a universal serial bus USB interface, and/or the like.

The memory 620 may be configured to store computer executable program code, and the executable program code includes instructions. The processor 610 runs the instructions stored in the memory 620, to perform various function applications and data processing of the smartwatch. The memory 620 may include a program storage area and a data storage area. The program storage area may store an operating system, an application (for example, a sound playback function or an image playback function) required by at least one function, and the like. The data storage area may store data (for example, audio data and an address book) and the like created when the smartwatch is used. In addition, the memory 620 may include a high-speed random access memory, and may alternatively include a non-volatile memory, for example, at least one magnetic disk storage device, a flash memory device, another volatile solid-state memory, or a universal flash storage (universal flash storage, UFS).

The display 630 is configured to display an image, a video, and the like. The display includes a display panel. The display panel may use a liquid crystal display LCD, an organic light-emitting diode OLED, an active matrix organic light-emitting diode AMOLED, a Miniled, a MicroLed, a Micro-oLed, a quantum dot light emitting diode QLED, or the like.

It should be noted that the structure shown in this embodiment of the present invention does not constitute a specific limitation on the smartwatch. If the electronic device is a smart band, smart glasses, or the like, the electronic device may include more or fewer components than those shown in the figure, or some components may be combined, or some components may be split, or a different component deployment may be used. The components in the figure may be implemented by hardware, software or a combination of software and hardware.

The data transmission method provided in embodiments of this application is described below.

Methods in the following embodiments may all be implemented in the first electronic device, the second electronic device, or the third electronic device that has the foregoing hardware structure. That the first electronic device is a notebook computer, the second electronic device is a mobile phone, and the third electronic device is a smartwatch is used as an example in embodiments of this application.

In the solution of this application, the third electronic device (for example, the smartwatch) can send data to the first electronic device (for example, the notebook computer) via the second electronic device (for example, the mobile phone), so that the first electronic device (for example, the notebook computer) can display the data sent by the third electronic device (for example, the smartwatch). Before the third electronic device (for example, the smartwatch) sends the data to the first electronic device (for example, the notebook computer) via the second electronic device (for example, the mobile phone), the first electronic device needs to establish a connection with the second electronic device, and the second electronic device needs to establish a connection with the third electronic device. That is, after the instruction channel between the first electronic device and the third electronic device is established through the second electronic device, the third electronic device can send data to the first electronic device through the second electronic device.

Figure 7A:
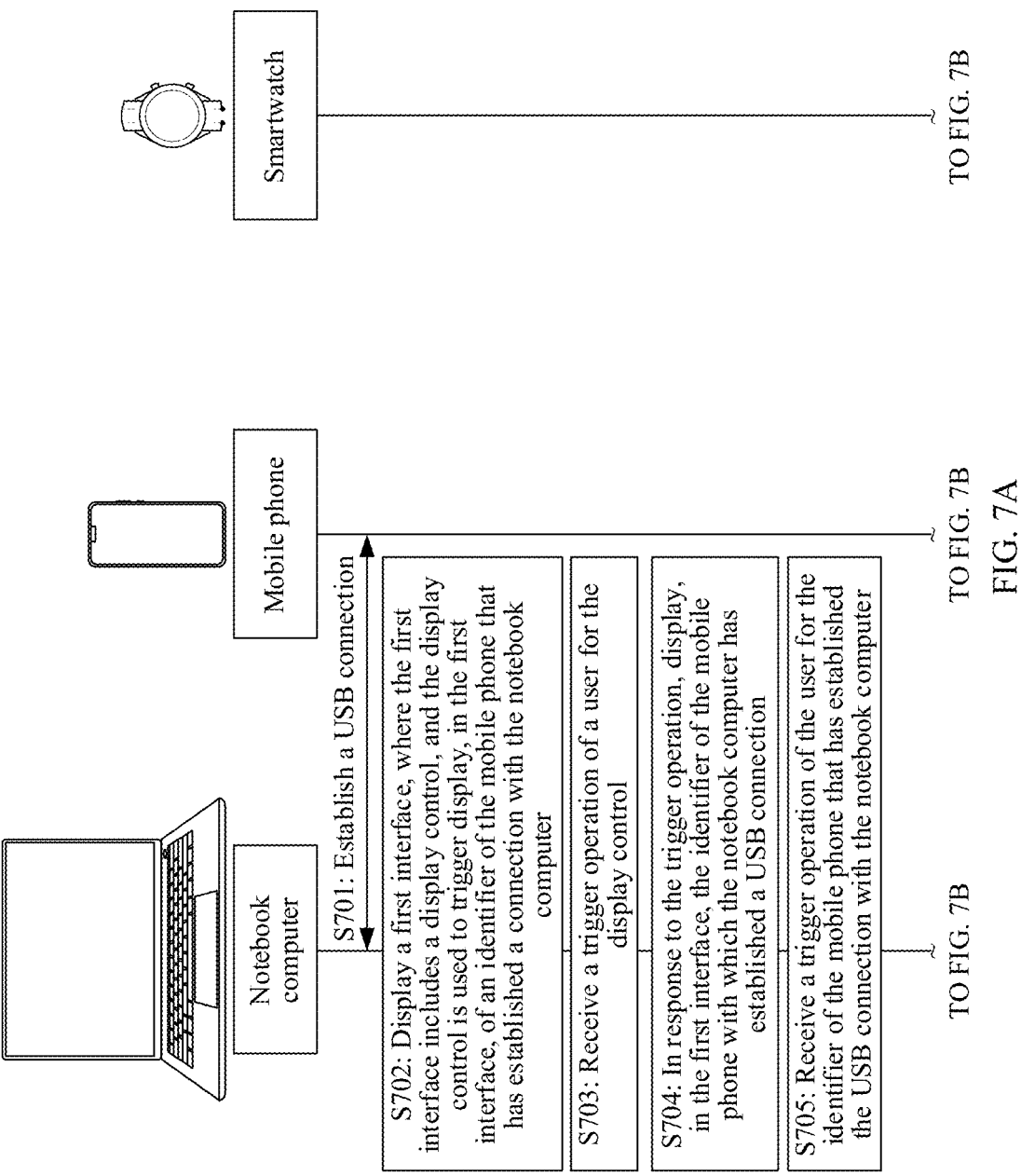
FIG. 7A to FIG. 7C are a schematic flowchart 1 of a data transmission method according to an embodiment of this application.
Figure 7B:
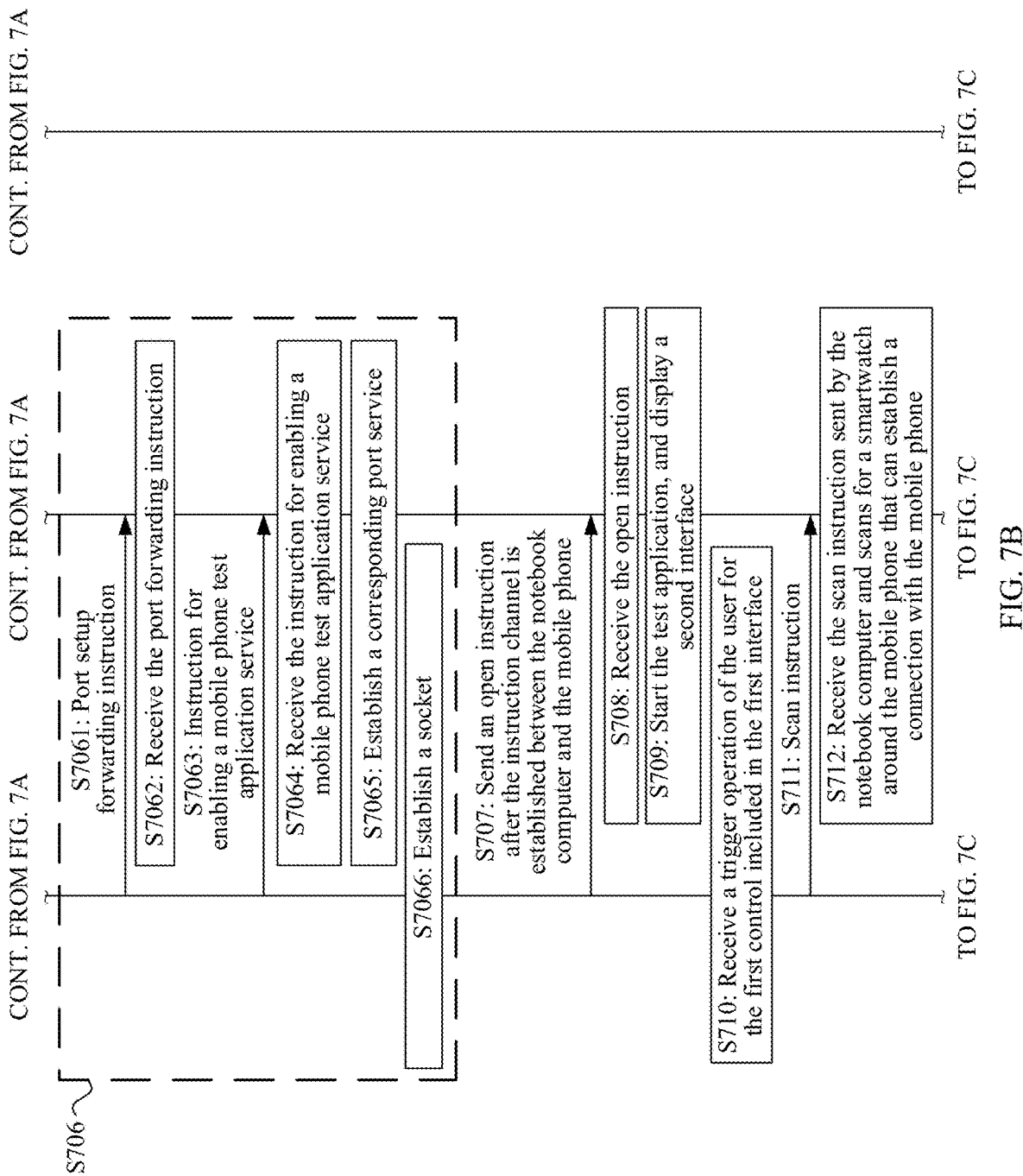
Figure 7C:
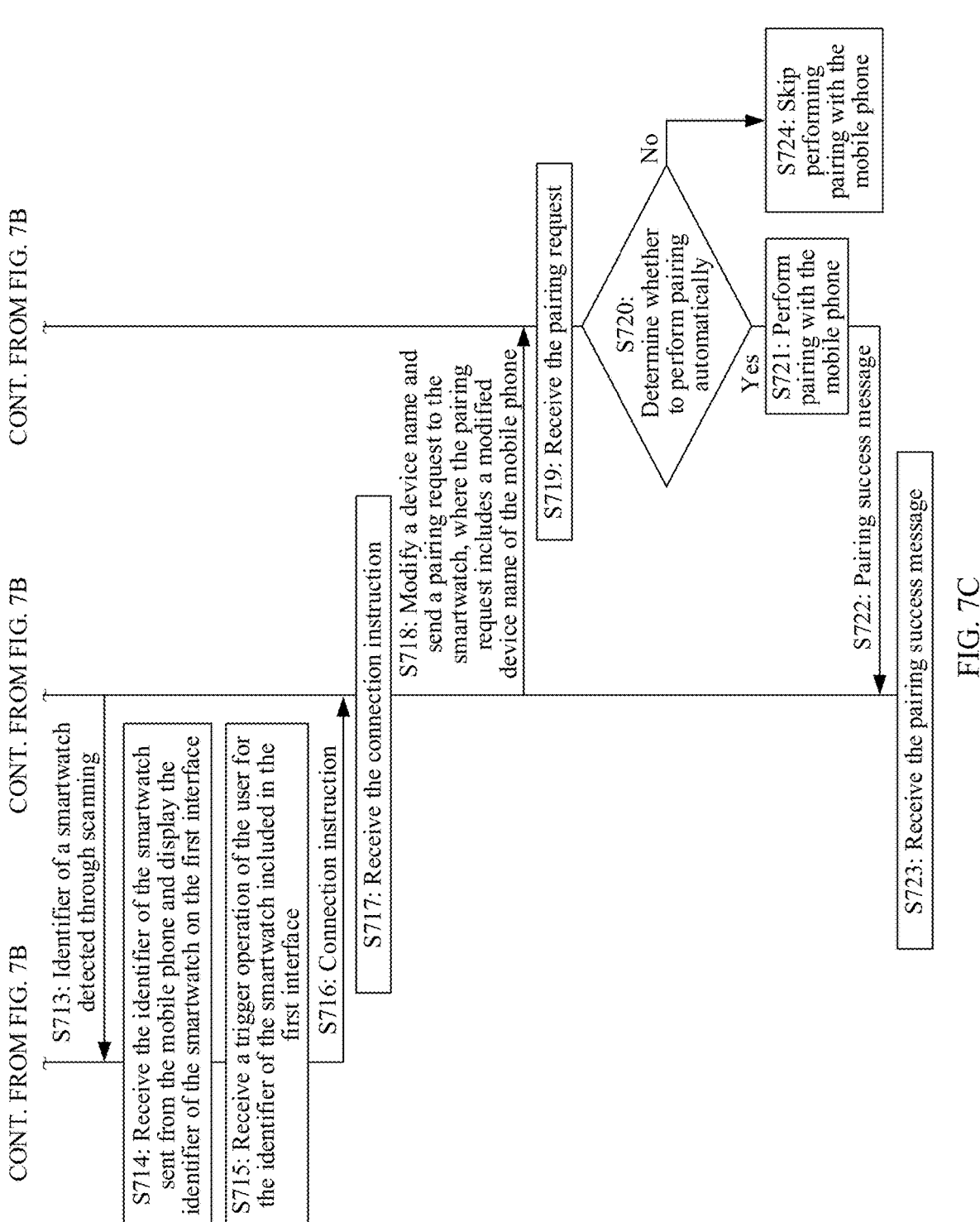

The data transmission method provided in the embodiments of this application is described below in detail with reference to FIG. 7A to FIG. 7C. As shown in FIG. 7A to FIG. 7C, that the first electronic device is a notebook computer, the second electronic device is a mobile phone, and the third electronic device is a smartwatch is used as an example for schematic description. The data transmission method provided in the embodiments of this application may include the following S701-S724

S701: The notebook computer establishes a USB connection with the mobile phone.

When a user needs to view and manage a file stored inside the smartwatch on the notebook computer, the notebook computer may establish an instruction channel between the notebook computer and the smartwatch through the mobile phone, the notebook computer may send an instruction to the smartwatch through the instruction channel, and the smartwatch may send the corresponding file to the notebook computer through the instruction channel.

In some examples, the notebook computer establishes the instruction channel between the notebook computer and the smartwatch via the mobile phone, which may include establishing an instruction channel between the notebook computer and the mobile phone, and establishing an instruction channel between the mobile phone and the smartwatch.

After the user establishes the USB connection between the notebook computer and the mobile phone, the notebook computer may establish the instruction channel with the mobile phone. For example, the user may connect the mobile phone to the notebook computer via a USB data cable, thus enabling the notebook computer to establish a USB connection to the mobile phone. After the user connects the mobile phone to the notebook computer via the USB data cable, an instruction channel can be established between the notebook computer and the mobile phone, that is, the notebook computer may execute S702-S706 described below.

It should be noted that another type of connection may alternatively be established between the notebook computer and the mobile phone, for example, establishing a Bluetooth connection or establishing a connection via Wi-Fi, and the manner in which the connection between the notebook computer and the mobile phone is established is not limited in this embodiment of this application. In the embodiment of this application, the establishment of a USB connection between the notebook computer and the mobile phone is taken as an example for schematic illustration.

S702: The notebook computer displays a first interface, where the first interface includes a display control, and the display control is used to trigger display, in the first interface, of an identifier of the mobile phone that has established a connection with the notebook computer.

The user may trigger the notebook computer to display the first interface after the USB connection is established between the notebook computer and the mobile phone; or the user may establish the USB connection between the notebook computer and the mobile phone after triggering the notebook computer to display the first interface. This is not limited in this embodiment of this application.

The first interface may be a display interface corresponding to an application on the notebook computer, and the application be used to view and manage files stored inside the smartwatch on the notebook computer. The first interface may alternatively be a display interface corresponding to a first web page on the notebook computer, and the first web page may be used to view and manage the file stored inside the smartwatch on the notebook computer. For example, after connecting the mobile phone to the notebook computer via the USB data cable, the user may open the corresponding web page on the notebook computer, so that the notebook computer can display the first interface. The user may alternatively open the corresponding web page on the notebook computer, and after the notebook computer displays the first interface, the user connects the mobile phone to the notebook computer via the USB data cable.

Figure 8:
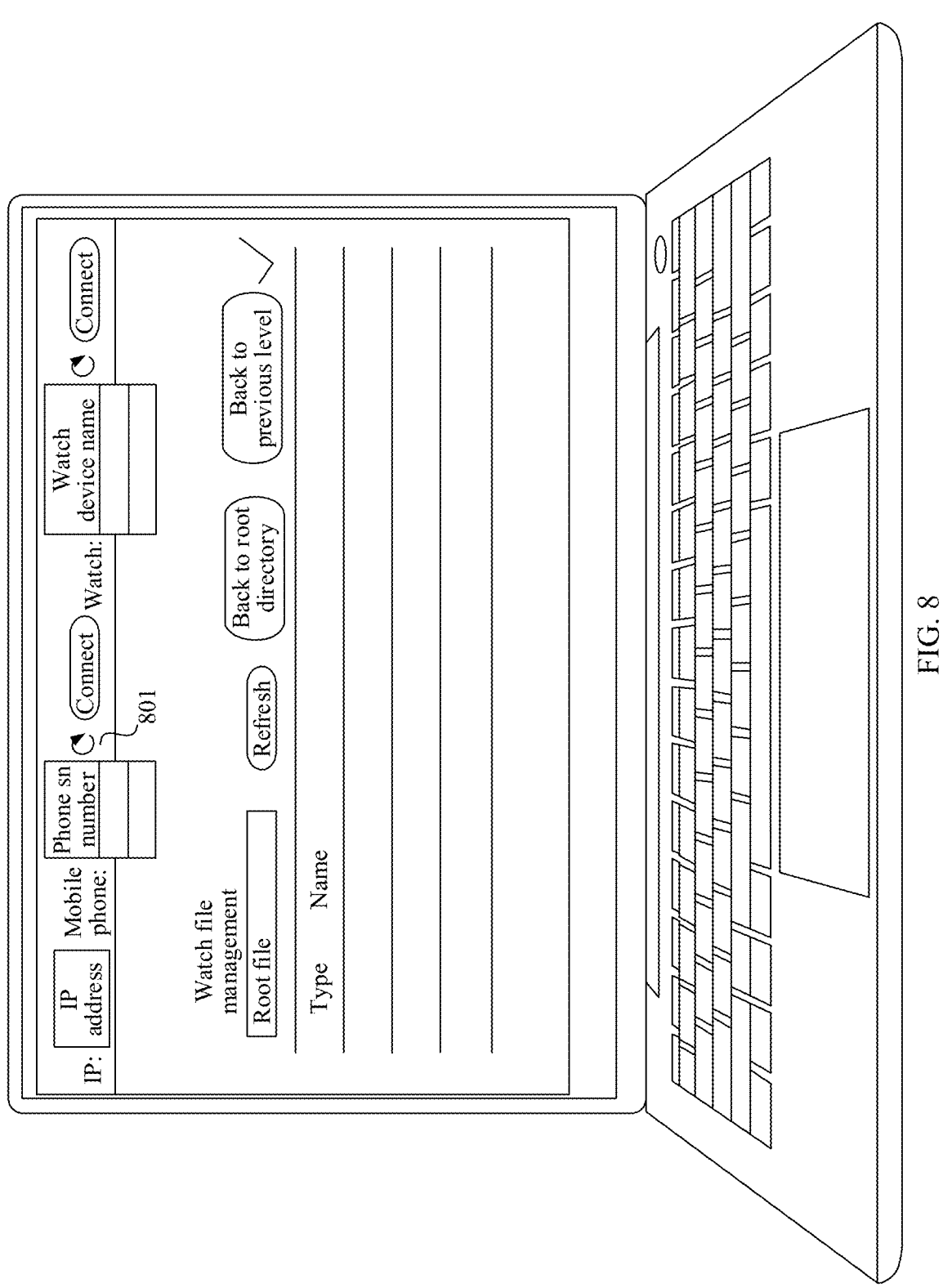
FIG. 8 is a schematic diagram 2 of a display interface of an electronic device according to an embodiment of this application.

The first interface may include a display control, and the display control may be used to trigger the display, in the first interface, of the identifier of the mobile phone that has a USB connection to the notebook computer. That is, in response to the notebook computer receiving a trigger operation of the user, such as a tap operation, on the display control included in the first interface, the notebook computer may display, in the first interface, the identifier of the mobile phone with which the notebook computer has established the USB connection. For example, after connecting the mobile phone to the notebook computer via the USB data cable, the user may open the corresponding web page on the notebook computer. As shown in FIG. 8, the notebook computer may display the first interface, that is, the display interface corresponding to the web page on the notebook computer that is used to view and manage the smartwatch. The first interface may include a display control, such as the refresh control 801 in the figure. In response to the notebook computer receiving a trigger operation of the user, such as a tap operation, on the refresh control 801 included in the first interface, the notebook computer may display, in the first interface, the identifier of the mobile phone with which the notebook computer has established the USB connection.

It should be noted that another type of connection may alternatively be established between the notebook computer and the mobile phone, for example, establishing a Bluetooth connection or establishing a connection via Wi-Fi, and the manner in which the connection between the notebook computer and the mobile phone is established is not limited in this embodiment of this application. In the embodiment of this application, the establishment of a USB connection between the notebook computer and the mobile phone is taken as an example for schematic illustration.

S703: The notebook computer receives a trigger operation of the user for the display control.

S704: In response to the trigger operation, the notebook computer displays, in the first interface, the identifier of the mobile phone with which the notebook computer has established a USB connection.

In response to the notebook computer receiving the trigger operation of the user, such as a tap operation, on the display control included in the first interface, the notebook computer may display the identifier of the mobile phone with which the notebook computer has established the USB connection. There may be one or more identifiers of mobile phones with which the notebook computer has established USB connections, that is, there may be one or more mobile phones that establish USB connections with the notebook computer. This is not limited in this embodiment of this application.

Figure 9:
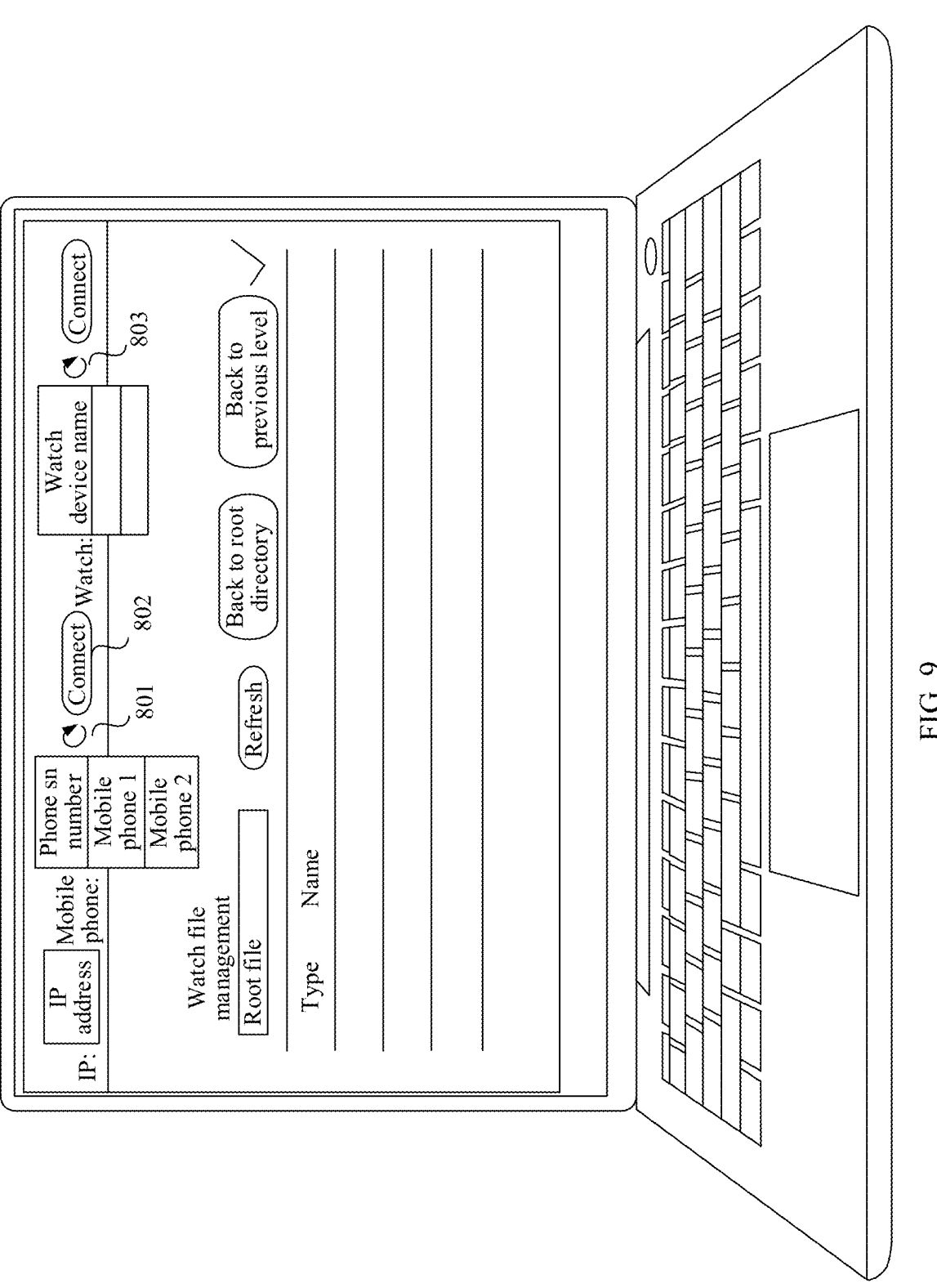
FIG. 9 is a schematic diagram 3 of a display interface of an electronic device according to an embodiment of this application.

For example, with reference to FIG. 8, in response to the notebook computer receiving a trigger operation of the user, such as a tap operation, on the refresh control 801 included in the first interface, the notebook computer may display, in the first interface, the identifier of the mobile phone with which the notebook computer has established the USB connection. When the notebook computer establishes USB connections with both a mobile phone 1 and a mobile phone 2, as shown in FIG. 9, the notebook computer may display an identifier of the mobile phone 1 and an identifier of mobile phone 2 in the first interface, that is, the mobile phones that establish USB connections with the notebook computer include the mobile phone 1 and the mobile phone 2, and the notebook computer displays the identifier of mobile phone 1 and the identifier of mobile phone 2 in the first interface, so that the user can establish an instruction channel between the notebook computer and the mobile phone 1 or establish an instruction channel between the notebook computer and the mobile phone 2 based on the identifier of the mobile phone 1 or the identifier of the mobile phone 2. When the user needs to establish an instruction channel between the notebook computer and the mobile phone 1, the user may trigger the identifier of the mobile phone 1, so that the notebook computer can establish an instruction channel with the mobile phone 1. When the user needs to establish an instruction channel between the notebook computer and the mobile phone 2, the user may trigger the identifier of the mobile phone 2, so that the notebook computer can establish an instruction channel with the mobile phone 2.

S705: The notebook computer receives a trigger operation of the user for the identifier of the mobile phone that has established the USB connection with the notebook computer.

After the notebook computer displays, in the first interface, the identifier of the mobile phone with which the notebook computer has established a USB connection, the user may trigger the identifier of the mobile phone so that the notebook computer can establish an instruction channel with the mobile phone. In some examples, the user's trigger operation for the identifier of the mobile phone that establishes a USB connection with the notebook computer may be the user's double-tap on the identifier of the mobile phone, or may be triggering, by the user, to select the identifier of the mobile phone and later triggering a connection control, so that the notebook computer can establish an instruction channel with the mobile phone. In the embodiment of this application, there is no limitation on the specific type of the user's trigger operation on the identifier of the mobile phone establishing the USB connection with the notebook computer.

For example, continue to refer to FIG. 9. The notebook computer may display the identifier of the mobile phone 1 and the identifier of the mobile phone 2 in the first interface. When the user needs to establish an instruction channel between the notebook computer and the mobile phone 1, the user may trigger the identifier of the mobile phone 1, thereby selecting the identifier of the mobile phone 1. After that, the user may trigger the connection control 802 in FIG. 9, so as to trigger the notebook computer to establish an instruction channel with the mobile phone 1. When the user needs to establish an instruction channel between the notebook computer and the mobile phone 2, the user may trigger the identifier of the mobile phone 2, so that the notebook computer can establish an instruction channel with the mobile phone 2.

S706: In response to the trigger operation, the notebook computer establishes an instruction channel with the mobile phone.

In response to the notebook computer receiving the trigger operation of the user, such as a tap operation, for the identifier of the mobile phone that is displayed in the first interface and that has established the USB connection with the notebook computer, the notebook computer may establish an instruction channel with the mobile phone so that the notebook computer can send an instruction to the mobile phone through the instruction channel, and the mobile phone can send data, such as a file stored inside the smartwatch, to the notebook computer through the instruction channel.

In some examples, the notebook computer may send an android debug bridge (android debug bridge, ADB) instruction to the mobile phone via the USB data cable, thereby establishing an instruction channel between the notebook computer and the mobile phone by using the ADB instruction. Specifically, with reference to FIG. 7B, S706 may specifically include the following S7061-S7066.

S7061: The notebook computer sends a port setup forwarding instruction to the mobile phone.

In response to the notebook computer receiving a trigger operation of the user, such as a tap operation, of a display control included in the first interface, the notebook computer may send a port setup forwarding instruction (which may be referred to as a first instruction in this embodiment of this application) to the mobile phone. The port forwarding instruction may be used to establish forwarding from a port on the notebook computer to a port on the mobile phone, that is, to establish an instruction channel between the port on the notebook computer and the port on the mobile phone, for example, to establish forwarding from port A on the notebook computer to port B on the mobile phone, that is, to establish an instruction channel between port A on the notebook computer and port B on the mobile phone. The port forward instruction may be an adb forward instruction, that is the adb forward instruction may be used to forward between port A on the notebook computer to port B on the mobile phone.

After establishing an instruction channel between port A on the notebook computer to port B on the mobile phone, the notebook computer may send instruction through port A to port B on the mobile phone, and the mobile phone may send files, or data, through port B to port A on the notebook computer.

S7062: The mobile phone receives the port forwarding instruction sent by the notebook computer.

After the mobile phone receives the port forwarding instruction from the notebook computer, the mobile phone may establish a forwarding from the port on the notebook computer to the corresponding port on the mobile phone.

S7063: The notebook computer sends, to the mobile phone, an instruction for enabling a mobile phone test application service.

After the mobile phone establishes forwarding between the port on the notebook computer to the corresponding port on the mobile phone, the notebook computer may send the instruction to the mobile phone to enable the mobile phone test application service. After the mobile phone receives, from the notebook computer, the instruction for enabling the mobile phone test application service, the mobile phone may enable the test application service (which may be referred to as the first application in this embodiment of this application) so that the mobile phone can establish a server-side socket on a port (for example, port B) and turn on the server to a listening state.

S7064: The mobile phone receives the instruction for enabling the mobile phone test application service that is sent by the notebook computer.

After the mobile phone receives the instruction for enabling the mobile phone test application service that is sent by the notebook computer, the mobile phone may enable the test application service, thus establishing a server-side socket on the corresponding port and turning on the server to the listening state.

S7065: The mobile phone establishes a corresponding port service.

S7066: The notebook computer establishes a socket.

After the test application service on the mobile phone is turned on, the notebook computer may create the corresponding client socket (Socket), thus enabling communication between the notebook computer and the mobile phone. For example, after establishing an instruction channel between port A on the notebook computer and port B on the mobile phone, the notebook computer may establish a socket so that the notebook computer can send an instruction to port B on the mobile phone through port A, and the notebook computer can receive a file or data from port B on the mobile phone through port A.

The socket (Socket) is the abstraction of an endpoint for bidirectional communication between application processes on different hosts in a network. A socket is one end of the communication between processes on the network, providing a mechanism for application layer processes to exchange data using a network protocol. In terms of its position, the socket is connected to the application process and the network stack, and is the interface through which the application communicates with the network protocol, and the interface through which the application interacts with the network stack.

After the notebook computer establishes the socket, the instruction channel between the notebook computer and the mobile phone is established, that is the communication between the notebook computer and the mobile phone is established. In other words, after the instruction channel is established between the notebook computer and the mobile phone, thus the notebook computer can send instruction to the mobile phone through the instruction channel, and the mobile phone can send data to the notebook computer through the instruction channel, such as the data stored inside the smartwatch such as files.

After the instruction channel is established between the notebook computer and the mobile phone, the notebook computer may send an adb instruction to the mobile phone through that instruction channel for obtaining, pushing, and deleting files or data stored in the mobile phone.

S707: After the instruction channel is established between the notebook computer and the mobile phone, the notebook computer sends an open instruction to the mobile phone.

In some examples, after the instruction channel between the notebook computer and the mobile phone is established, the notebook computer may send the open instruction to the mobile phone. The open instruction may be used to instruct the mobile phone to open the home screen of the test application, that is, the open instruction is used to instruct the mobile phone to start the test application and display the interface corresponding to the test application. The test application may be used to scan for the presence of devices around the mobile phone that can establish a connection (for example, establish a Bluetooth connection) with the mobile phone, such as a smartwatch.

For example, continue to refer to FIG. 9. The notebook computer may establish an instruction channel with the mobile phone when the notebook computer receives a trigger operation of the user, such as a tap operation, on the connection control 802. After the instruction channel is established between the notebook computer and the mobile phone, and after the instruction channel is successfully established between the notebook computer and the mobile phone, the notebook computer may send an open instruction to the mobile phone so that the mobile phone can open the home screen of the test application.

S708: The mobile phone receives the open instruction sent by the notebook computer.

S709: The mobile phone starts the test application, and displays a second interface.

After the mobile phone receives the open instruction from the notebook computer, the mobile phone may start the test application and display the second interface.

In some examples, the second interface may include a connection status of the smartwatch with which the mobile phone may establish a connection and a corresponding media access control address (media access control address, MAC) of the smartwatch.

Figure 10:
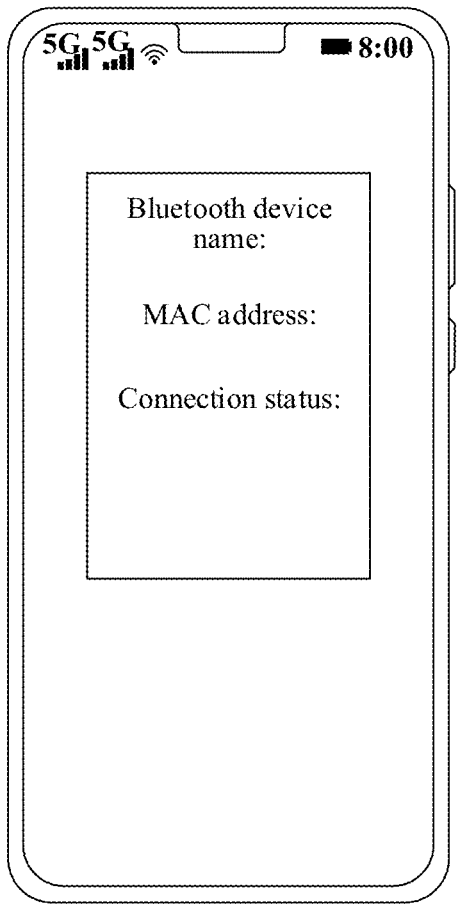
FIG. 10 is a schematic diagram 4 of a display interface of an electronic device according to an embodiment of this application.

For example, after the mobile phone receives the open instruction from the notebook computer, the mobile phone may start the test application and display the second interface as shown in FIG. 10. The second interface may include the name of the smartwatch that may establish a connection to the mobile phone, the connection status, and the corresponding MAC address of the smartwatch.

S710: The notebook computer receives a trigger operation of the user for the first control included in the first interface.

After the notebook computer displays the first interface, that is, the display interface corresponding to the web page on the notebook computer for viewing and managing the smartwatch, the first interface may also include a first control, and the first control may be used to trigger the display of an identifier of a smartwatch capable of establishing a connection (for example, establishing a Bluetooth connection) with the mobile phone in the first interface. That is, in response to the notebook computer receiving the trigger operation of the user, such as a tap operation, on the first control included in the first interface, the notebook computer may display, in the first interface, the identifier of the smartwatch capable of establishing a connection with the mobile phone.

For example, continue to refer to FIG. 9. The notebook computer may establish an instruction channel with the mobile phone when the notebook computer receives a triggered operation, such as a tap operation, from the user connection control 802. After the notebook computer successfully establishes the instruction channel with the mobile phone, the user may trigger the first control included in the first interface, such as the refresh control 803 in FIG. 9, so that the notebook computer can display, in the first interface, the identifier of the smartwatch capable of establishing a connection with the mobile phone.

S711: In response to the trigger operation, the notebook computer sends a scan instruction to the mobile phone.

In response to the notebook computer receiving a user triggered action, such as a tap action, on the first control included in the first interface, the notebook computer sends a scan instruction to the mobile phone. The scan instruction may be used to instruct the mobile phone to determine if there is an electronic device around the mobile phone that can establish a connection to the mobile phone.

In some examples, before the notebook computer sends the scan instruction to the mobile phone, the notebook computer needs to check if the mobile phone starts the test application successfully. For example, before the notebook computer sends a scan instruction to the mobile phone, the notebook computer sends a confirmation instruction to the mobile phone, which is used to instruct the mobile phone to determine if starting the test application is successful. After the mobile phone receives the confirmation instruction from the notebook computer, the mobile phone may determine if starting the test application is successful.

When the mobile phone determines the success of starting the test application, such as the mobile phone has displayed the interface corresponding to the test application, that is, the mobile phone has displayed the second interface, the mobile phone may determine the success of starting the test application and the mobile phone may send the start success instruction to the notebook computer. After the notebook computer receives a start success instruction from the mobile phone, the notebook computer may determine that the mobile phone started the test application successfully so that the notebook computer can send a scan instruction to the mobile phone.

When the mobile phone determines that starting the test application is unsuccessful, for example, the mobile phone does not display the interface corresponding to the test application, that is, the mobile phone does not display the second interface, the mobile phone may determine that starting the test application is unsuccessful and the mobile phone may send a start failure instruction to the notebook computer. After the notebook computer receives a failed start instruction from the mobile phone, the notebook computer may determine that the mobile phone is unsuccessful in starting the test application so that the notebook computer cannot send a scan instruction to the mobile phone.

For example, continue to refer to FIG. 9. The notebook computer may establish an instruction channel with the mobile phone when the notebook computer receives a trigger operation of the user, such as a tap operation, on the connection control 802. After the instruction channel is successfully established between the notebook computer and the mobile phone, the user may trigger the first interface including the first control, such as the refresh control 803 in FIG. 9. In response to the notebook computer receiving the trigger operation of the user, such as a tap operation, for the refresh control 803 included in the first interface, the notebook computer may send a scan instruction to the mobile phone.

S712: The mobile phone receives the scan instruction sent by the notebook computer and scans for a smartwatch around the mobile phone that can establish a connection with the mobile phone.

After the mobile phone receives the scan instruction sent by the notebook computer, the mobile phone may scan for a device around the mobile phone that can establish a connection with the mobile phone. The device around the mobile phone that can establish a connection with the mobile phone may be a smart wearable device, such as a smartwatch. The connection that can be established between the smartwatch and the mobile phone may be a Bluetooth connection. This is not limited in the embodiment of this application.

In some examples, the mobile phone may scan, by using a test application, for a device around the mobile phone that can establish a connection with the mobile phone.

S713: The mobile phone sends an identifier of a smartwatch detected through scanning to the notebook computer.

After the mobile phone detects the presence of the smartwatch around the mobile phone that can establish a connection with the mobile phone, the mobile phone may send the identifier of the smartwatch detected through scanning to the notebook computer. The identifier of the smartwatch may include a name of the smartwatch as well as a MAC address of the smartwatch.

S714: The notebook computer receives the identifier of the smartwatch sent from the mobile phone and displays the identifier of the smartwatch on the first interface.

After the notebook computer receives the identifier of the smartwatch sent from the mobile phone, the notebook computer may display the identifier of the smartwatch on the first interface, and the user may trigger the identifier of the smartwatch to trigger the establishment of a connection between the mobile phone and the smartwatch, such as establishing a Bluetooth connection.

Figure 11:
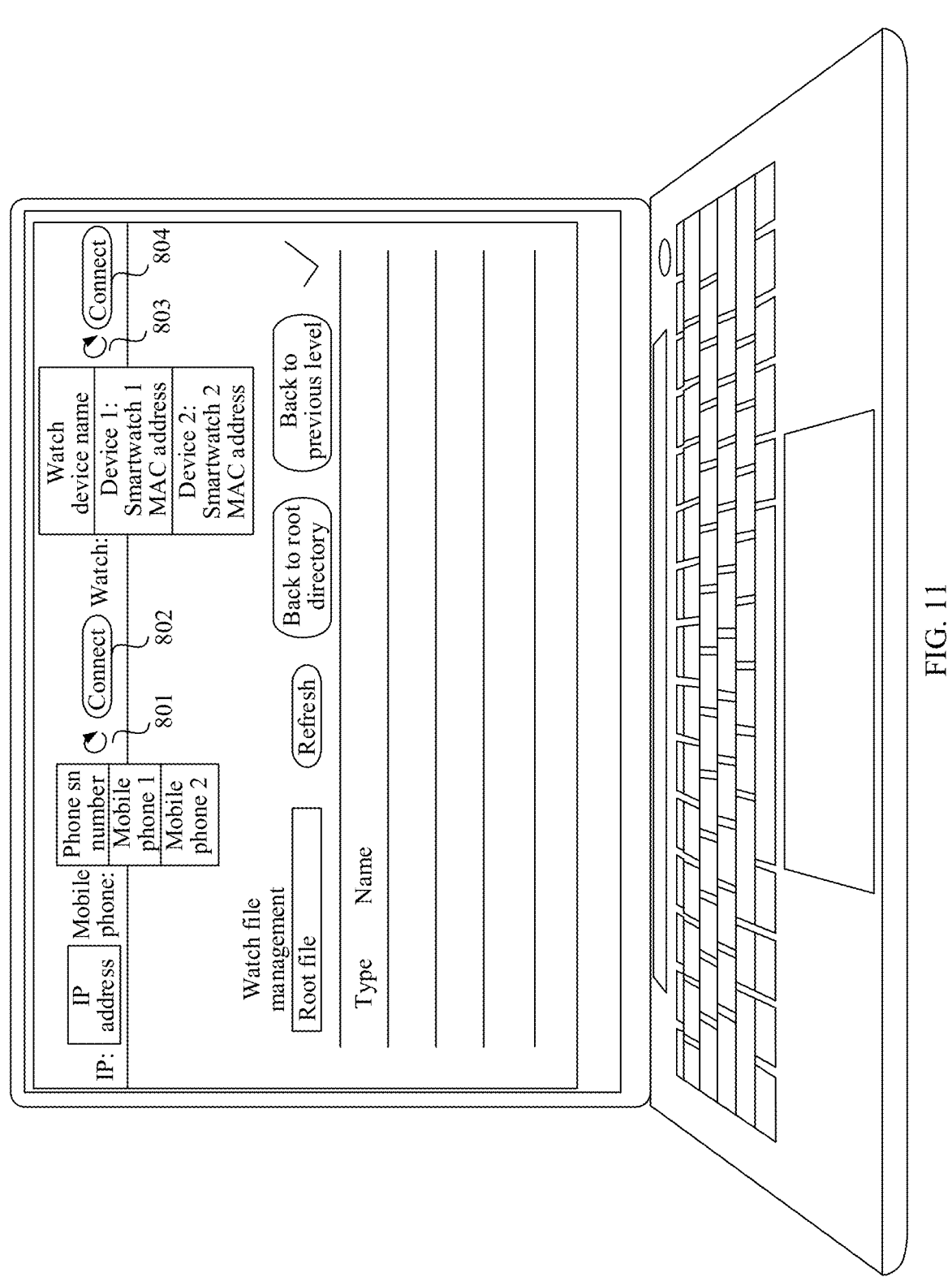
FIG. 11 is a schematic diagram 5 of a display interface of an electronic device according to an embodiment of this application.

For example, continue to refer to FIG. 9. In response to the notebook computer receiving the trigger operation of the user, such as a tap operation, on the refresh control 803 (that is, the first control) included in the first interface, the notebook computer may send a scan instruction to the mobile phone, which, upon receiving the scan instruction, scans for the smartwatch around the mobile phone that is capable of establishing a connection with the mobile phone. After the mobile phone detects the presence of smartwatches around the mobile phone that are capable of establishing a connection with the mobile phone, the mobile phone may send the identifier of the detected smartwatch to the notebook computer, that is, the name of the smartwatch, such as smartwatch 1 as well as smartwatch 2, and the MAC addresses corresponding to smartwatch 1 and smartwatch 2. After the notebook computer receives the identifier of the smartwatch sent from the mobile phone, as shown in FIG. 11, the notebook computer may display the identifier of the smartwatch sent from the mobile phone, that is, Smartwatch 1 as well as Smartwatch 2, and the MAC addresses corresponding to Smartwatch 1 and Smartwatch 2.

S715: The notebook computer receives a trigger operation of the user for the identifier of the smartwatch included in the first interface.

After the notebook computer displays the smartwatch identifier on the first interface, the user may trigger the smartwatch identifier, which triggers the establishment of a connection between the mobile phone and the smartwatch, such as establishing a Bluetooth connection.

S716: In response to the trigger operation, the notebook computer sends a connection instruction to the mobile phone.

In response to the notebook computer receiving the trigger operation of the user, such as a tap operation, of the identifier of the smartwatch included in the first interface, the notebook computer may send a connection instruction to the mobile phone. The connection instruction may include the name of the smartwatch as well as the MAC address of the smartwatch. The connection instruction may be used to instruct the mobile phone to connect to the smartwatch included in the connection instruction.

For example, with reference to FIG. 11, the notebook computer displays the identifier of the smartwatch sent by the mobile phone after receiving the identifier of the smartwatch, that is, smartwatch 1 as well as smartwatch 2, and the MAC addresses corresponding to smartwatch 1 and smartwatch 2. When the user needs to establish a connection between the mobile phone and the smartwatch 1, the user may trigger the identifier of the smartwatch 1 and thus check the identifier of the smartwatch 1. After that, the user may trigger the connection control 804 in FIG. 11, which can trigger the notebook computer to send a connection instruction to the mobile phone so that a connection can be established between the mobile phone and the smartwatch 1.

S717: The mobile phone receives the connection instruction sent by the notebook computer.

S718: The mobile phone modifies the device name and sends a pairing request to the smartwatch, and the pairing request includes the modified device name of the mobile phone.

After the mobile phone receives the connection instruction from the notebook computer, the mobile phone may modify the device name of the mobile phone and send a pairing request to the smartwatch. The pairing request may be used to request the smartwatch to establish a connection with the mobile phone. The pairing request may include the modified device name of the mobile phone.

In some examples, the mobile phone may modify the device name of the mobile phone by using the test application. The modified device name may include a device name as well as an identification character. The identification character is used to indicate that the smartwatch may be automatically paired with the mobile phone, that is, the smartwatch may be automatically connected to the mobile phone. For example, the original device name of the mobile phone is phone 1, the modified device name may be phone 1+AUTOCONNECT, and AUTOCONNECT is the identification character.

In some examples, after the mobile phone is successfully connected to the smartwatch, the mobile phone may change the device name back to the original device name, which does not affect the connection logic between the mobile phone's other applications and the smartwatch.

In other examples, before the mobile phone sends a pairing request to the smartwatch, the mobile phone may pop up a pairing box, such as a Bluetooth pairing box, for the user to confirm whether the user agrees to pair with the smartwatch. The pairing box may include two options, an "Agree" option and a "Decline" option. The mobile phone may listen to the Bluetooth pairing box during the pairing process and automatically confirm if the pairing box pops up. This means that the mobile phone may listen to the Bluetooth pairing box, and when the mobile phone pops up the Bluetooth pairing box, the mobile phone may automatically trigger the confirmation option included in the Bluetooth pairing box, which can reduce user actions.

S719: The smartwatch receives the pairing request sent by the mobile phone.

S720: The smartwatch determines whether to perform pairing automatically.

After the smartwatch receives the pairing request from the mobile phone, the smartwatch may determine whether to pair with the mobile phone automatically based on the pairing request.

In some examples, the smartwatch may determine whether to automatically pair with the mobile phone based on the mobile phone's modified device name included in the pairing request, such as the smartwatch may determine whether the mobile phone's modified device name includes the device name as well as identification characters, such as AUTOCONNECT. That is, the smartwatch may determine whether the smartwatch is automatically paired with the mobile phone by determining whether the pairing request sent by the mobile phone includes the identification character. In the case that the smartwatch determines that the pairing request includes the identifier character, the smartwatch may automatically pair with the mobile phone, that is, the smartwatch may directly pair with the mobile phone without pop-up windows or requiring the user to tap the Agree option in the prompt window, which can reduce the user's operation.

When the smartwatch determines to perform automatic pairing, the smartwatch can be paired directly with the mobile phone, that is, the smartwatch can directly establish a connection with the mobile phone, such as a Bluetooth connection, that is, the smartwatch can continue to perform S721-S723. In the case that the smartwatch determines that it cannot be paired automatically, the smartwatch can refuse to pair with the mobile phone, that is, the smartwatch can refuse to establish a connection with the mobile phone, such as a Bluetooth connection, that is, the smartwatch can continue to perform S724.

S721: The smartwatch is paired with the mobile phone.

If the smartwatch determines to perform automatic pairing, the smartwatch can be paired directly with the mobile phone.

S722: The smartwatch sends a pairing success message to the mobile phone.

After the smartwatch is successfully paired with the mobile phone, the smartwatch can send a pairing success message to the mobile phone. The pairing success message may include the name of the smartwatch that is successfully paired with the mobile phone, the MAC address of the smartwatch, and the connection status of the smartwatch.

S723: The mobile phone receives the pairing success message from the smartwatch.

Figure 12:
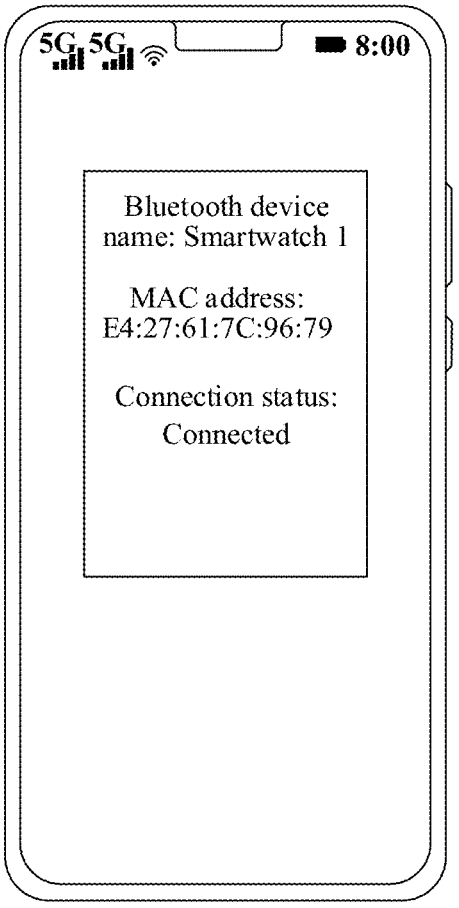
FIG. 12 is a schematic diagram 6 of a display interface of an electronic device according to an embodiment of this application.

In some examples, after the mobile phone receives a pairing success message from the smartwatch, the mobile phone may display, on a second display interface, the name of the smartwatch that is successfully connected to the mobile phone (that is, successfully paired) and the MAC address of the smartwatch. For example, after the smartwatch 1 is successfully paired with the mobile phone, the smartwatch 1 may send a pairing success message to the mobile phone, and the pairing success message, may include the name of the smartwatch that is successfully paired with the mobile phone, that is, smartwatch 1, and the MAC address of smartwatch 1. After the mobile phone receives a pairing success message from Smartwatch 1, as shown in FIG. 12, the mobile phone can display the name of Smartwatch 1 (that is, Smartwatch 1), the MAC address of the Smartwatch, and the connection status of Smartwatch 1 (that is, connected).

After the smartwatch sends a pairing success message to the mobile phone, the mobile phone can receive the pairing success message from the smartwatch. After the mobile phone receives the pairing success message from the smartwatch, the connection between the mobile phone and the smartwatch (which can also be referred to as the instruction channel) is established, that is the communication between the smartwatch and the mobile phone has been established. In other words, after the instruction channel is established between the mobile phone and the smartwatch, the mobile phone can send instruction to the smartwatch through the instruction channel, and the smartwatch can send data, such as files stored inside the smartwatch, to the mobile phone through the instruction channel.

S724: The smartwatch is not paired with the mobile phone.

If the smartwatch determines to not perform automatic pairing, the smartwatch can skip performing pairing with the mobile phone.

In the solution of this application, the notebook computer can establish an instruction channel between the notebook computer and the smartwatch through the mobile phone, so that the notebook computer can send an instruction to the smartwatch through the mobile phone, such as an instruction to obtain a file in the smartwatch. The smartwatch can send a relevant file to the notebook computer through the mobile phone after receiving the instruction sent from the mobile phone. After the mobile phone receives the file sent by the smartwatch, the mobile phone can send the file to the notebook computer, thus enabling the user to view the file saved inside the third electronic device on the notebook computer for the user's convenience.

In addition, the solution of this application does not require the user to perform operations on the mobile phone and the smartwatch when establishing the instruction channel between the notebook computer and the smartwatch through the mobile phone, which can further reduce the user's operation more and further improve the user's experience.

In some examples, after the notebook computer establishes an instruction channel between the notebook computer and the smartwatch via the mobile phone, the notebook computer can send instruction to the smartwatch via the mobile phone to access the files in the smartwatch, and in turn the notebook computer can display the files in the smartwatch.

Figure 13:
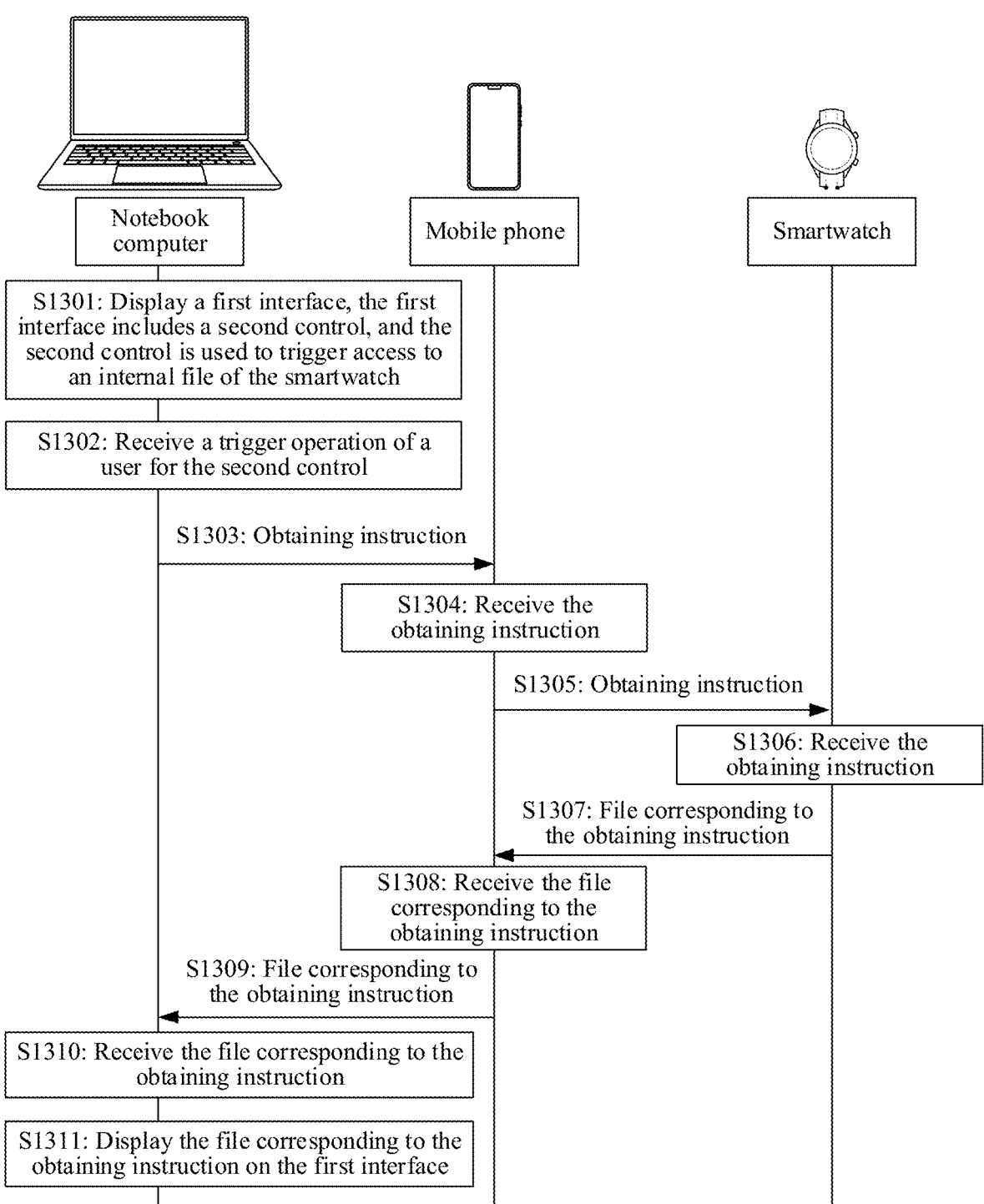
FIG. 13 is a schematic flowchart 2 of a data transmission method according to an embodiment of this application.

For example, continuing with the example of the first electronic device being a notebook computer, the second electronic device being a cellular phone, and the third electronic device being a smartwatch, as shown in FIG. 13, after the notebook computer establishes an instruction channel between the notebook computer and the smartwatch via the cellular phone, the process of the notebook computer accessing a file stored inside the smartwatch via that instruction channel may include the following S1301-S1311.

S1301: The notebook computer displays a first interface, the first interface includes a second control, and the second control is used to trigger access to an internal file of the smartwatch.

After the notebook computer establishes an instruction channel between the notebook computer and the smartwatch via the mobile phone, the user can trigger an operation on the first interface displayed by the notebook computer (that is, the display interface corresponding to the application used to view and manage the files stored inside the smartwatch), such as triggering the second control included in the first interface, thereby triggering the notebook computer to obtain the internal files of the smartwatch. The first interface may include a second control, which may be used to trigger the notebook computer to send an obtaining instruction to the mobile phone, thereby enabling access to the internal files of the smartwatch.

For example, with reference to FIG. 11, the user can trigger the identifier of the smartwatch 1 when the user needs to establish a connection between the mobile phone and the smartwatch 1, thereby checking the identifier of the smartwatch 1. After that, the user can trigger the connection control 804 in FIG. 11 so that a connection can be established between the mobile phone and the smartwatch 1. After a connection is established between the mobile phone and the smartwatch 1, the first interface may include a second control, such as the refresh control 805 in FIG. 14, in which the user can trigger the refresh control 805 when the user needs to display the internally stored files of the smartwatch 1 on the notebook computer, thereby allowing the notebook computer to send an obtaining instruction to the mobile phone so that the notebook computer can obtain and display the internal files of the smartwatch.

S1302: The notebook computer receives a trigger operation of the user for the second control.

When the user needs to view and manage a file stored inside the smartwatch on the notebook computer, the user can trigger the second control included in the first interface displayed by the notebook computer. That is, in response to the trigger operation of the user (which may be referred to as a third operation in this embodiment of this application), such as a tap operation, for the second control included in the first interface, the notebook computer may send an obtaining instruction to the mobile phone, to obtain the internal file of the smartwatch.

Figure 14:
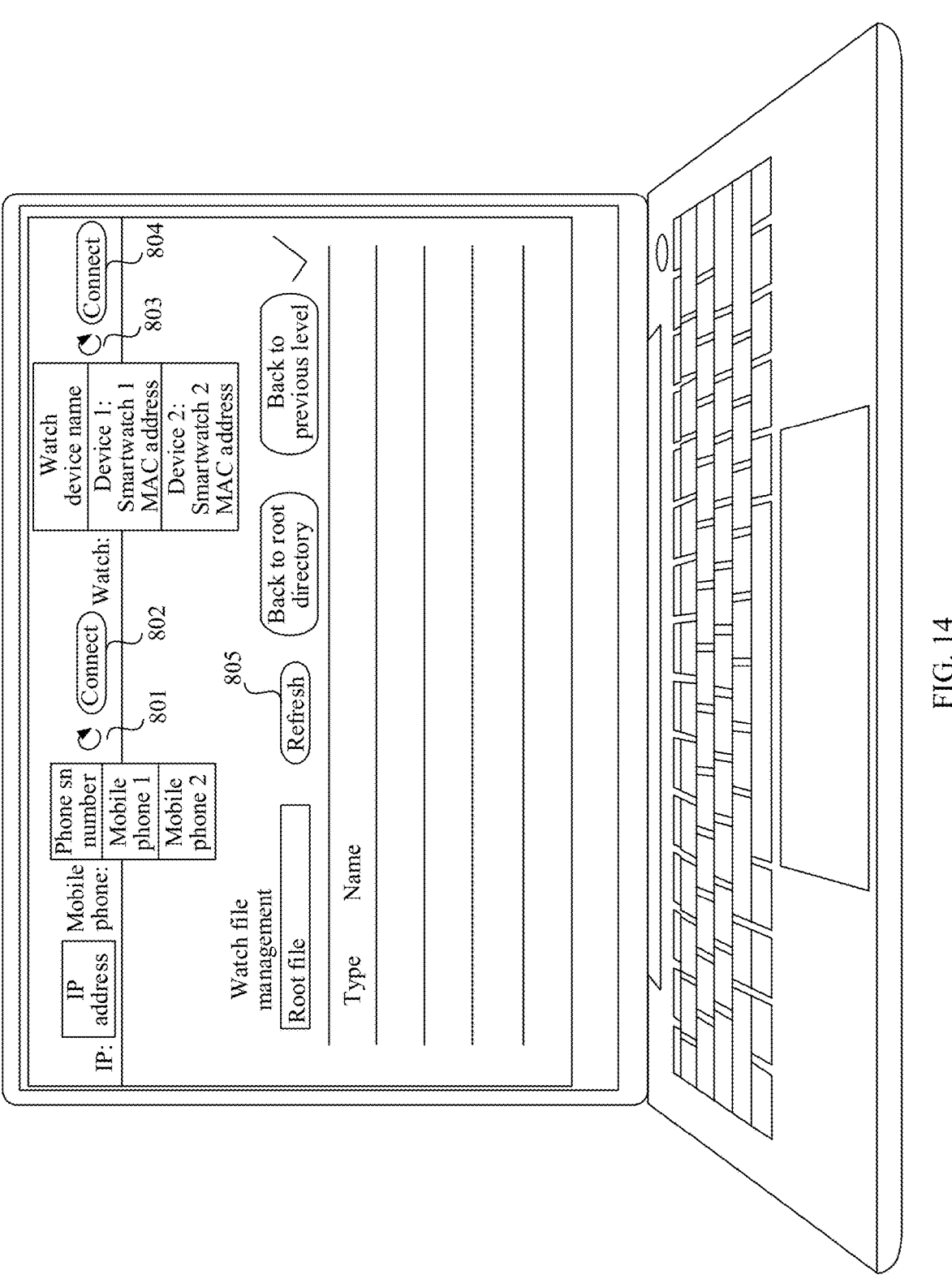
FIG. 14 is a schematic diagram 7 of a display interface of an electronic device according to an embodiment of this application.

For example, with reference to FIG. 14, the user can trigger a refresh control 805 when the user needs to display the internally stored file of the smartwatch 1 on the notebook computer. That is, in response to the notebook computer receiving the trigger operation of the user, such as a tap operation, for the refresh control 805 included in the first interface, the notebook computer can send an obtaining instruction to the mobile phone to be able to access the internal files of the smartwatch.

S1303: In response to the trigger operation, the notebook computer sends an obtaining instruction to the mobile phone.

In response to the notebook computer receiving the trigger operation of the user, such as a tap action, on the second control included in the first interface, the notebook computer can send an obtaining instruction to the mobile phone. The obtaining instruction may be used to instruct to obtain the file stored internally in the smartwatch that has established connection with the mobile phone. The obtaining instruction may include the identifier of the first data (that is, the file corresponding to the obtaining instruction). The first data can be all of the data stored inside the smartwatch, or some of the data stored inside the smartwatch, or the first type of data stored inside the smartwatch. The first type can be music, pictures, logs, or the like.

The files stored internally in the smartwatch may include files generated in the smartwatch during use, and may also include the configuration files of the smartwatch. This is not limited in this embodiment of this application. The files generated in the smartwatch during use can be the exercise record files generated by the smartwatch when the user is exercising with the smartwatch, or the health data generated by the smartwatch when the user is using the smartwatch for health monitoring, such as the user's heart rate, blood oxygen and other data, or the files such as a maintenance log generated by the smartwatch when the user is using the smartwatch.

In some examples, the obtaining instruction may be used to direct access to a portion of the internally stored files of the smartwatch to which the connection to the mobile phone is established, and the obtaining instruction may alternatively be used to direct access to all of the internally stored files of the smartwatch to which the connection to the mobile phone is established. Where the obtaining instruction is used to instruct to acquire a portion of a file stored internally of the smartwatch to which the connection to the mobile phone is established, the obtaining instruction may include an identifier of the portion of the file to be acquired, such as a name of the portion of the file to be acquired.

In some examples, the obtaining instruction can be a custom instruction. The custom instruction can be used to instruct the mobile phone to perform various operations. The custom instruction may carry data. For example, the custom instruction can be used to instruct the mobile phone to automatically pair with the smartwatch, that is, to instruct the mobile phone to automatically connect to the smartwatch. An instruction format of the custom instruction may be instruction #data. When the custom instruction can be used to instruct the mobile phone to pair with the smartwatch automatically, the instruction can be auto-connect (for example REQ_AUTO_CONNECT_DEVICE) and the data can be the MAC address of the smartwatch (for example "E4:27:61:7C:96:79"), and the custom instruction may be REQ_AUTO_CONNECT_DEVICE #"E4:27:61:7C:96: 79".

In other examples, the obtaining instruction may be a Bluetooth instruction. The Bluetooth instruction may be used to control the smartwatch. That is, the notebook computer can implement coding and decoding of a hexadecimal Bluetooth instruction, and the notebook computer can send a Bluetooth instruction as data to the mobile phone. When the mobile phone receives the Bluetooth instruction, the mobile phone can send the Bluetooth instruction to the smartwatch, and when the smartwatch receives the Bluetooth instruction, the smartwatch may execute a corresponding operation. The smartwatch can return a message to the mobile phone, and the mobile phone can determine if the reply message content from the smartwatch is a reply to a Bluetooth instruction, and if so, the mobile phone can return this data to the notebook computer. After the notebook computer receives the data sent from the mobile phone, it can parse that data so that it can display the acquired data, that is the files stored inside the smartwatch.

S1304: The mobile phone receives the obtaining instruction sent by the notebook computer.

S1305: The mobile phone sends the obtaining instruction to the smartwatch.

After the mobile phone receives the obtaining instruction from the notebook computer, the mobile phone can send the obtaining instruction to the smartwatch, that is the mobile phone forwards the obtaining instruction sent by the notebook computer to the smartwatch.

S1306: The smartwatch receives the obtaining instruction sent by the mobile phone.

S1307: The smartwatch sends a file corresponding to the obtaining instruction to the mobile phone.

After the smartwatch receives the obtaining instruction sent by the mobile phone, the smartwatch can send the file corresponding to the obtaining instruction to the mobile phone according to the obtaining instruction.

S1308: The mobile phone receives the file corresponding to the obtaining instruction sent by the smartwatch.

S1309: The mobile phone sends the file corresponding to the obtaining instruction to the notebook computer.

After the mobile phone receives the file corresponding to the obtaining instruction sent by the smartwatch, the mobile phone can send the file corresponding to the obtaining instruction to the smartwatch.

S1310: The notebook computer receives the file corresponding to the obtaining instruction sent by the mobile phone.

S1311: The notebook computer displays the file corresponding to the obtaining instruction in the first interface.

After the notebook computer receives the file corresponding to the obtaining instruction sent by the mobile phone (that is, the first data), the notebook computer can display the file corresponding to the obtaining instruction on the first interface so that the user can view the file corresponding to the obtaining instruction, that is, the file stored inside the smartwatch, on the first interface. The user can alternatively manage to obtain the files corresponding to the instruction on the first interface, such as deleting files, creating new files or moving files.

Figure 15:
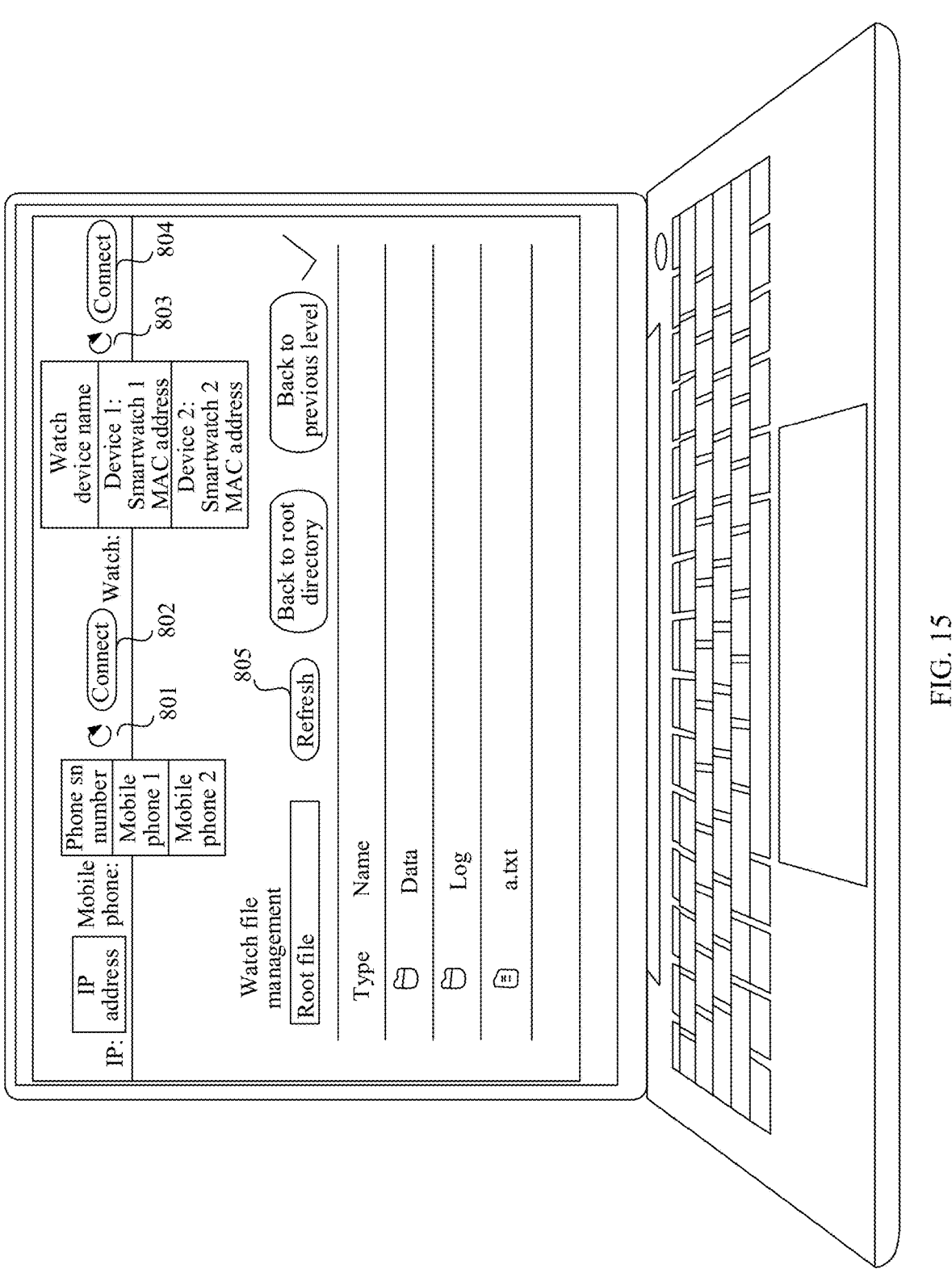
FIG. 15 is a schematic diagram 8 of a display interface of an electronic device according to an embodiment of this application.

For example, with reference to FIG. 14, the user can trigger the refresh control 805 when the user needs to display the internally stored file of the smartwatch 1 on the notebook computer. That is, in response to the notebook computer receiving the trigger operation of the user, such as a tap operation, on the refresh control 805 included in the first interface, the notebook computer can send an obtaining instruction to the mobile phone to be able to obtain the internal file of the smartwatch 1. When the notebook computer receives the file corresponding to the obtaining instruction sent by the mobile phone, as shown in FIG. 15, the notebook computer can display the file corresponding to the obtaining instruction, that is, the data file as well as the log file, etc.

In some examples, the notebook computer displays the file corresponding to the acquisition instruction in the first interface, which can be for the notebook computer to display the file corresponding to the acquisition instruction in a predetermined manner based on the file corresponding to the acquisition instruction (that is, the type of the first data). The preset way can be to store different types of files in different directory structures, that is, when the files corresponding to the acquisition instructions are displayed on the first interface of the notebook computer, the notebook computer can display the files corresponding to the acquisition instructions based on the directory structure included in the notebook computer and the types of files corresponding to the acquisition instructions. For example, when the notebook computer includes a directory structure including data and logs, the notebook computer may store the file corresponding to the obtaining instruction, that is, the data file in the file stored internally in the smartwatch, in a data directory included in the notebook computer, and the notebook computer may store the file corresponding to the obtaining instruction, that is, the log file in the file stored internally in the smartwatch, in a log directory included in the notebook computer.

In some examples, the user can alternatively customize the directory structure of the smartwatch based on their needs. That is, the user can modify the directory structure corresponding to the files stored inside the smartwatch on the display interface of the notebook computer. For example, the user can create a new folder, such as the music folder, and store the music-related files in the files stored inside the smartwatch into the music folder, and the user can alternatively create a new folder, such as the sports record folder, and store the sports record-related files in the files stored inside the smartwatch into the sports record folder. That is, the user can create a virtual file operating system by integrating the files stored inside the smartwatch to be displayed on the interface displayed by the notebook computer.

The user can alternatively establish a mapping of the files stored inside the smartwatch to the directory structure on the notebook computer. After the notebook computer obtains the file stored inside the smartwatch, it can save this file to the corresponding file directory based on the established mapping relationship, so that the user sees the redefined directory structure on the interface displayed by the notebook computer, which not only protects the internal directory information of the smartwatch, but also allows the user to quickly view the files stored inside the smartwatch according to their needs.

In the solution of this application, an instruction channel is established between the notebook computer and the smartwatch through the mobile phone, so that the smartwatch can send data to the notebook computer through the mobile phone and the notebook computer can display the data sent by the smartwatch, that is, the smartwatch can send the first data to the notebook computer directly through the mobile phone, that is, the mobile phone forwards the data sent by the smartwatch without first storing the data in the mobile phone and then importing that data from the mobile phone to the notebook computer, thereby simplifying the process for the user when viewing the data from the smartwatch on the notebook computer.

After establishing the instruction channel between the notebook computer and the smartwatch via the mobile phone, the notebook computer can send an instruction to the smartwatch via the mobile phone, such as an instruction to obtain files in the smartwatch. The smartwatch can send a relevant file to the notebook computer through the mobile phone after receiving the instruction sent from the mobile phone. After the mobile phone receives the file sent by the smartwatch, the mobile phone can send the file to the notebook computer, thus enabling the user to view the file saved inside the third electronic device on the notebook computer for the user's convenience.

In addition, since the instruction channel between the notebook computer and the smartwatch is established through the mobile phone, the notebook computer can send an instruction to the smartwatch through the instruction channel (that is, the mobile phone), and the smartwatch can send a related file to the notebook computer through the instruction channel (that is, the mobile phone). In other words, the solution of this application does not require the user to perform an operation on the mobile phone when the smartwatch exports the relevant files stored internally to the mobile phone, thereby reducing the user's operation and improve the user's experience.

In addition, in a process of establishing the instruction channel between the notebook computer and the smartwatch through the mobile phone, the user does not need to perform operations on the mobile phone and the smartwatch. This can reduce the user's operations and further facilitate the user's use.

Figure 16A:
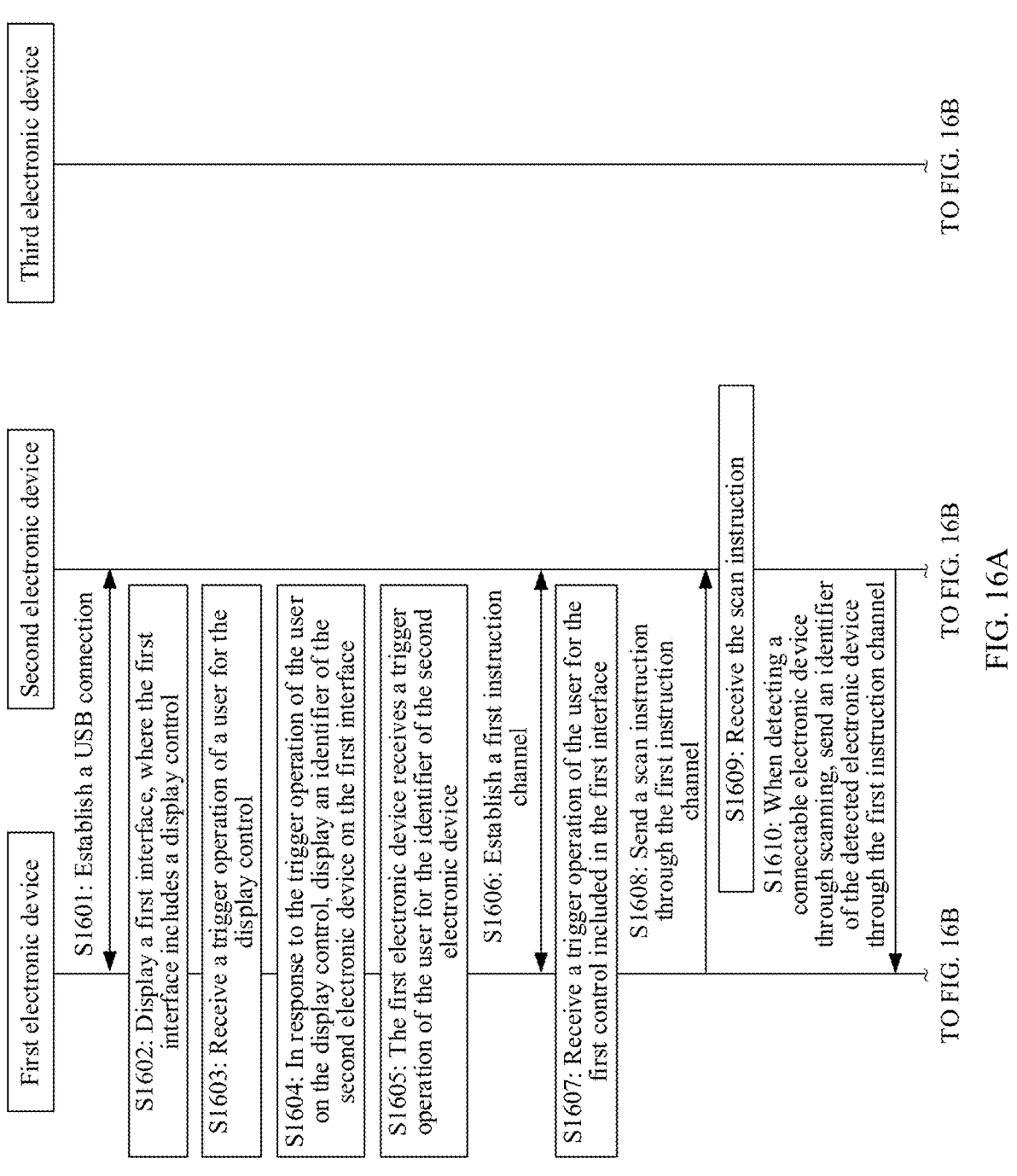
FIG. 16A and FIG. 16B are a schematic flowchart 3 of a data transmission method according to an embodiment of this application.
Figure 16B:
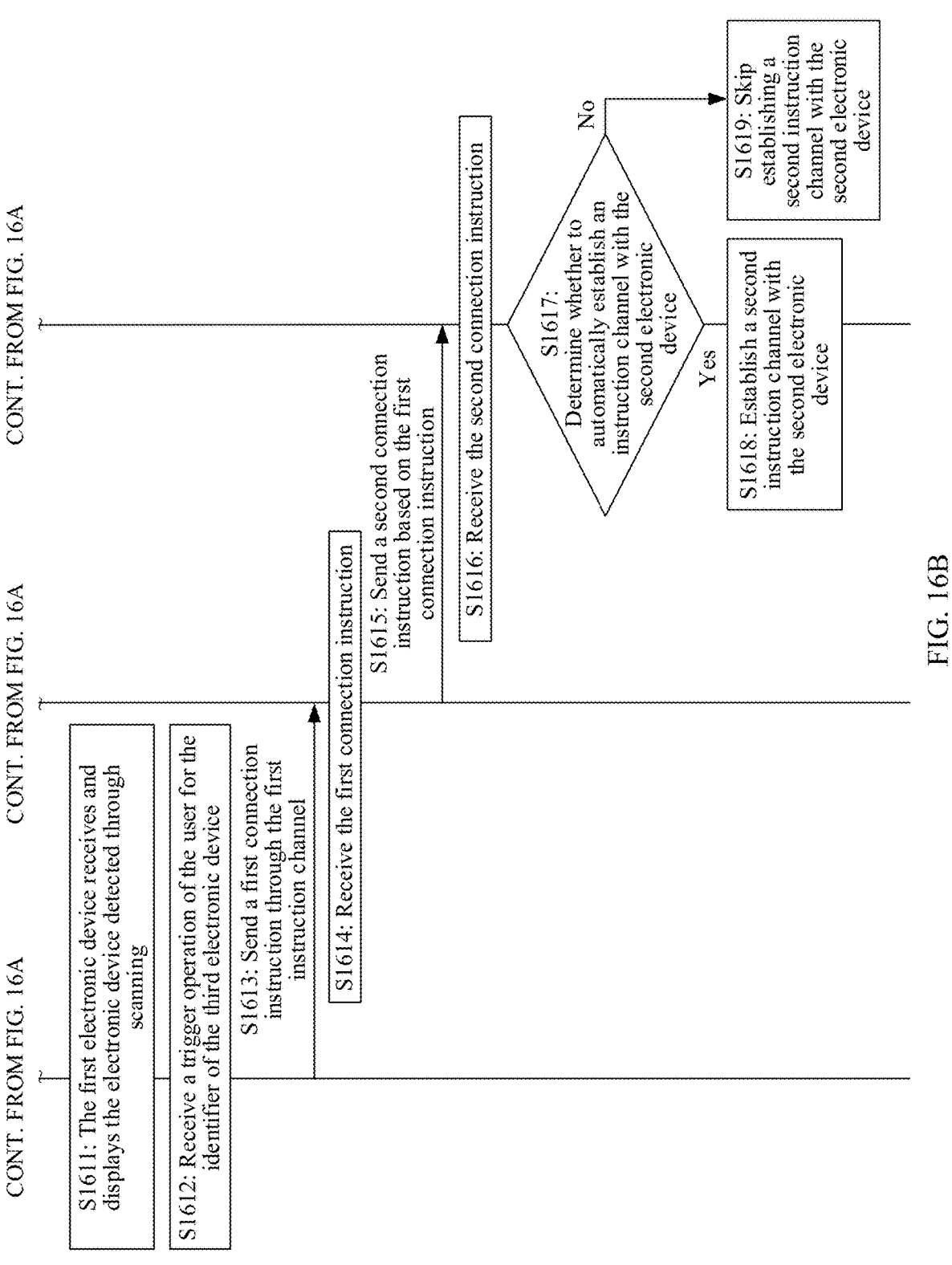

For ease of understanding, the data transmission method provided in the embodiments of this application is described below in detail with reference to FIG. 16A and FIG. 16B. As shown in FIG. 16A and FIG. 16B, the data transmission method may include the following S1601-S1619.

S1601: A first electronic device establishes a USB connection with a second electronic device.

The data transmission method provided in this embodiment of this application can be applied to a data transmission system. The data transmission system may include the first electronic device, the second electronic device, and a third electronic device.

The first electronic device may be a notebook computer, a tablet computer, a handheld computer, a PC, a PDA, and another electronic device. A specific type of the first electronic device is not limited in the embodiment of this application. In embodiments of this application, description is made by using an example in which the first electronic device is a notebook computer.

The second electronic device may be an electronic device such as a mobile phone, a tablet computer, a handheld computer, a personal computer PC, a cellular phone, a PDA, or a wearable device. In embodiments of this application, description is made by using an example in which the second electronic device is a mobile phone.

The third electronic device may be a smart wearable device, for example, a smartwatch, a smart band, smart glasses, or the like. In embodiments of this application, description is made by using an example in which the third electronic device is a smartwatch.

The first electronic device and the second electronic device establish a USB connection, which may alternatively be a Bluetooth connection. This is not limited in the embodiment of this application. In the embodiment of this application, that the connection established between the first electronic device and the second electronic device is a USB connection is used as an example for illustration.

In this embodiment of this application, the first electronic device establishes a connection with the second electronic device, which can be referred to S701 above. Details are not described in this embodiment of this application again.

S1602: The first electronic device displays a first interface, where the first interface includes a display control.

After the connection between the first electronic device and the second electronic device is established, the first electronic device can display the first interface. The first interface may include a display control, and the display control may be used to trigger the first electronic device to display an identifier of the second electronic device on the first interface. That is, the second electronic device is the electronic device that establishes a USB connection with the first electronic device.

The first electronic device in this embodiment of this application displays a first interface, and the first interface includes display controls, which can be referred to S702 above, and this embodiment of this application is not repeated here.

S1603: The first electronic device receives a trigger operation performed by a user on the display control.

S1604: In response to the trigger operation of the user on the display control, the first electronic device displays an identifier of the second electronic device on the first interface.

In response to the first electronic device receiving the trigger operation of the user, such as a tap operation, on the first control included in the first interface, the first electronic device may display the identifier of the second electronic device with which the first electronic device has established a connection (for example, established a USB connection).

In this embodiment of this application, the first electronic device displays the identifier of the second electronic device on the first interface, which can be referred to S704 above. Details are not described in this embodiment of this application again.

S1605: The first electronic device receives a trigger operation of the user for the identifier of the second electronic device.

S1606: In response to the trigger operation of the user for the identifier of the second electronic device, the first electronic device establishes a first instruction channel with the second electronic device.

In response to the first electronic device receiving a trigger operation, such as a tap operation, of the user for the identifier of the second electronic device, the first electronic device may establish a first instruction channel with the second electronic device. After the first instruction channel is established, that is, the connection between the first electronic device and the second electronic device is successfully established, the first electronic device can send an instruction to the second electronic device through the first instruction channel, such as an obtaining instruction (for example, an instruction to obtain a file inside the third electronic device), and the first electronic device can receive a file (which can also be referred to as data) from the second electronic device through this first instruction channel, such as a file corresponding to the obtaining instruction (for example, the instruction to obtain a file inside the third electronic device).

In this embodiment of this application, the first electronic device establishes the first instruction connection with the second electronic device, which can be referred to S706 above. Details are not described in this embodiment of this application again.

S1607: The first electronic device receives a trigger operation of the user for an identifier of the first control included in the first interface.

After the first electronic device establishes the first instruction channel with the second electronic device, the first electronic device can send a scan instruction to the second electronic device so that the second electronic device can determine whether the third electronic device is present.

The third electronic device is the electronic device capable of establishing a connection with the second electronic device.

The first interface may include a first control that triggers the first electronic device to send a scan instruction to the second electronic device. The scan instruction is used to instruct the second electronic device to enable scanning and scan for a connectable electronic device.

S1608: In response to the trigger operation of the user for the first control, the first electronic device sends a scan instruction to the second electronic device via the first instruction channel.

In response to the first electronic device receiving the trigger operation of the user (which may be a first operation) of the first control, such as a tap operation, the first electronic device may send a scan instruction to the second electronic device via the first instruction channel. The scan instructions may be used to instruct the second electronic device to scan for a connectable electronic device around the second electronic device, that is, the second electronic device determines whether there is an electronic device around the second electronic device that can establish a connection with the second electronic device, such as the third electronic device.

The first electronic device in this embodiment of this application sends the scan instruction to the second electronic device, which can be referred to S711 above. Details are not described in this embodiment of this application again.

S1609: The second electronic device receives the scan instruction sent by the first electronic device.

S1610: When the second electronic device detects a connectable electronic device through scanning, the second electronic device sends an identifier of the detected electronic device to the first electronic device via the first instruction channel.

After the second electronic device receives the scan instruction sent by the first electronic device, the second electronic device enables the scan function so that the electronic device that can be connected to the second electronic device can be detected. The detected electronic device may include the third electronic device.

The second electronic device may send first indication information to the first electronic device when the second electronic device detects the third electronic device. The first indication information is used for indicating a connectable electronic device detected by the second electronic device through scanning. The connectable electronic device includes the third electronic device. The first indication information may include the identifier of the third electronic device (such as the MAC address of the third electronic device), may also include a serial number of the third electronic device, which is not limited by this embodiment of this application. This embodiment of this application is schematically illustrated with the first indication information including the identifier of the third electronic device. That is, when the second electronic device detects the third electronic device, the second electronic device can send the identifier of the third electronic device to the first electronic device. The identifier of the third electronic device may include the name of the third electronic device and the MAC address of the third electronic device.

The second electronic device in this embodiment of this application scans for a connectable electronic device and sends to the first electronic device the identifier of the detected connectable electronic device, such as the identifier of the third electronic device, which can be referred to S713 above. Details are not described in this embodiment of this application again.

S1611: the first electronic device receives and displays the identifier of the detected electronic device.

The first electronic device may receive the identifier of the detected electronic device from the second electronic device. The identifier of the detected electronic device may include the identifier of the third electronic device, and the first electronic device may display the identifier of the third electronic device after the first electronic device receives the identifier of the third electronic device sent by the second electronic device.

The first electronic device in this embodiment of this application receives and displays the identifier of the third electronic device, which can be referred to S714 above, and this embodiment of this application is not repeated here.

S1612: The first electronic device receives a trigger operation of the user for the identifier of the third electronic device.

After the first electronic device displays the identifier of the third electronic device, the user can trigger the identifier of the third electronic device, thereby triggering the establishment of a second instruction channel between the second electronic device and the third electronic device, such as the establishment of a Bluetooth instruction channel.

The first electronic device in this embodiment of this application receives the triggering operation of the user for the identifier of the third electronic device (which can be the second operation), which can be referred to S715 above, and this embodiment of this application is not repeated here.

S1613: In response to the trigger operation, the first electronic device sends a first connection instruction to the second electronic device via the first instruction channel.

In response to the first electronic device receiving a trigger operation, such as a tap operation, of the user for the identifier of the third electronic device, the first electronic device may send a connection instruction to the second electronic device. The connection instruction may include the name of the third electronic device as well as the MAC address of the third electronic device. The connection instruction may be used to instruct the second electronic device to establish an instruction channel with the third electronic device included in the connection instruction, such as instructing the second electronic device to establish a Bluetooth instruction channel with the third electronic device.

The first electronic device in this embodiment of this application sends the first connection instruction to the second electronic device, which can be referred to S716 above. Details are not described in this embodiment of this application again.

S1614: The second electronic device receives the first connection instruction sent by the first electronic device.

S1615: The second electronic device sends a second connection instruction to the third electronic device based on the first connection instruction.

After the second electronic device receives the first connection instruction from the first electronic device, the second electronic device may send a second connection instruction, which may also be referred to as a pairing request, to the third electronic device. The pairing request, which may include the name of the device after the second electronic device is modified.

The second connection instruction may also include a first identifier, and the first identifier may be used to instruct the third electronic device to automatically establish an instruction channel with the second electronic device.

The second electronic device in this embodiment of this application sends the second connection instruction to the second electronic device, which can be referred to S718 above. Details are not described in this embodiment of this application again.

S1616: The third electronic device receives the second connection instruction sent by the second electronic device.

S1617: The third electronic device determines whether to automatically establish an instruction channel with the second electronic device.

After the third electronic device receives a connection request from the second electronic device, the third electronic device may determine whether to automatically establish an instruction channel with the second electronic device.

In the event that the third electronic device determines to automatically establish an instruction channel with the second electronic device, that is, the third electronic device may proceed to execute S1618. In the event that the third electronic device determines not to automatically establish an instruction channel with the second electronic device, that is, the third electronic device may continue to execute S1619.

In some examples, where the third electronic device determines not to automatically establish an instruction channel with the second electronic device, the third electronic device may also display a prompt window for indicating whether the user agrees to the connection. The prompt window can include the words "Agree to connect" and can include two options, Yes and No.

When the third electronic device receives the user's "Yes" option (that is, confirmation option) in the prompt window to trigger an operation, such as a tap operation, the third electronic device can establish an instruction channel with the second electronic device, that is, the third electronic device can establish a connection with the second electronic device. When the third electronic device receives the trigger operation of the user for the "No" option in the prompt window, such as a tap operation, the third electronic device may not establish an instruction channel with the second electronic device, that is, the third electronic device may not establish a connection with the second electronic device.

In some examples, the third electronic device determines whether to automatically establish an instruction channel with the second electronic device, which may include the third electronic device determining whether the first identifier is included in the second connection instruction, where the third electronic device determines that the first identifier is included in the second connection instruction. In the event that the third electronic device determines that the second connection instruction does not include the first identifier, the third electronic device may determine not to automatically establish an instruction channel with the second electronic device.

The third electronic device in this embodiment of this application determines whether the instruction channel is automatically established with the second electronic device, which can be referred to S720 above. Details are not described in this embodiment of this application again.

S1618: The third electronic device establishes a second instruction channel with the second electronic device.

The third electronic device establishes a second instruction channel with the second electronic device, that is, the third electronic device establishes a connection with the second electronic device. After the second instruction channel is established, the second electronic device can send instruction to the third electronic device through this second instruction channel, such as an obtaining instruction sent by the first electronic device to the second electronic device (for example, an instruction to obtain a file inside the third electronic device), and the second electronic device can receive files sent by the third electronic device through this second instruction channel, such as a file corresponding to an obtaining instruction sent by the first electronic device to the second electronic device (for example, an instruction to obtain a file inside the third electronic device).

S1619: The third electronic device does not establish a second instruction channel with the second electronic device.

In the solution of this application, the first electronic device may establish the instruction channel between the first electronic device and the third electronic device through the second electronic device. Then, the first electronic device may send an instruction to the third electronic device through the second electronic device. After the third electronic device receives the instruction sent by the first electronic device, the third electronic device may send a relevant file to the first electronic device through the second electronic device, so that the user can view the internally stored file of the third electronic device on the first electronic device, which is convenient for the user to use.

In addition, in the solution of this application, since the instruction channel between the first electronic device and the third electronic device is established through the second electronic device, the first electronic device can send an instruction to the third electronic device through the instruction channel (that is, the second electronic device), and the third electronic device can send a relevant document to the first electronic device through the instruction channel (that is, the second electronic device). In other words, in the solution of this application, the user does not need to perform an operation on the second electronic device when the third electronic device exports the relevant files stored internally to the second electronic device, which can reduce the user's operations and thus improve user experience.

In addition, the solution of this application does not require the user to perform operations on the second electronic device and the third electronic device when establishing the instruction channel between the first electronic device and the third electronic device through the second electronic device. This can reduce the user's operations and further facilitate the user's use.

Corresponding to the method in the foregoing embodiments, embodiments of this application further provide a data transmission apparatus. The data transmission apparatus may be applied to an electronic device to implement the method in the foregoing embodiments. Functions of the display apparatus may be implemented by using hardware or may be implemented by using hardware executing corresponding software. The hardware or software includes one or more modules corresponding to the above function.

Figure 17:
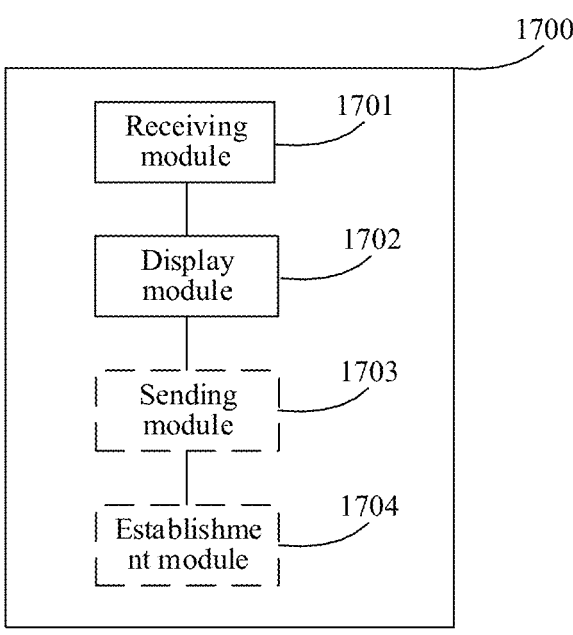
FIG. 17 is a schematic diagram 1 of a structure of a data transmission apparatus according to an embodiment of this application.

For example, FIG. 17 illustrates a schematic diagram of a structure of a data transmission device 1700. As shown in FIG. 17, the data transmission device 1700 may include: a receiving module 1701, a display module 1702, and the like.

The receiving module 1701 may be configured to receive first data forwarded by the second electronic device. The first data is data sent by a third electronic device to the second electronic device through a connection established between the third electronic device and the second electronic device.

The display module 1702 may be configured to display the first data.

In another possible implementation, the data transmission apparatus 1700 may further include a sending module 1703. The sending module 1703 may be configured to send a first connection instruction to the second electronic device, where the first connection instruction is used to instruct the second electronic device to establish a connection with the third electronic device.

With reference to the fifth aspect, in another possible implementation, the sending module 1703 may be configured to send a scan instruction to the second electronic device, where the scan instruction is used to instruct the second electronic device to scan for a connectable electronic device.

The receiving module 1701 may be configured to receive first indication information sent by the second electronic device. The first indication information is used for indicating a connectable electronic device detected by the second electronic device through scanning. The connectable electronic device includes the third electronic device.

In another possible implementation, the display module 1702 may further be configured to display the connectable electronic device, where the connectable electronic device includes the third electronic device. The receiving module 1701 may be further configured to receive a second operation performed by a user on the third electronic device.

In another possible implementation, the first connection instruction includes an identifier of the third electronic device.

In another possible implementation, the receiving module 1701 may be further configured to receive a third operation performed by the user on a second control.

The sending module 1703 may be further configured to send an obtaining instruction to the second electronic device in response to the third operation, where the obtaining instruction includes an identifier of the first data.

In another possible implementation, the display module 1702 may be further configured to display the first data in a preset manner based on a type of the first data.

In another possible implementation, the sending module 1703 may be further configured to send a first instruction to the second electronic device, where the first instruction is used to instruct the second electronic device to establish a connection between a port of the second electronic device and a port of the first electronic device.

The sending module 1703 may be further configured to send a second instruction to the second electronic device, where the second instruction is used to instruct the second electronic device to enable a service corresponding to a first application. The first application is used for scanning for a connectable electronic device.

The above data transmission apparatus 1700 may further include an establishment module 1704. The establishment module 1704 may be configured to establish a socket.

In another possible implementation, the first electronic device is a computer, the second electronic device is a mobile phone, and the third electronic device is a wearable electronic device.

Embodiments of this application further provide a data transmission apparatus. The data transmission apparatus may be applied to a second electronic device to implement the method in the foregoing embodiments. Functions of the display apparatus may be implemented by using hardware or may be implemented by using hardware executing corresponding software. The hardware or software includes one or more modules corresponding to the above function.

Figure 18:
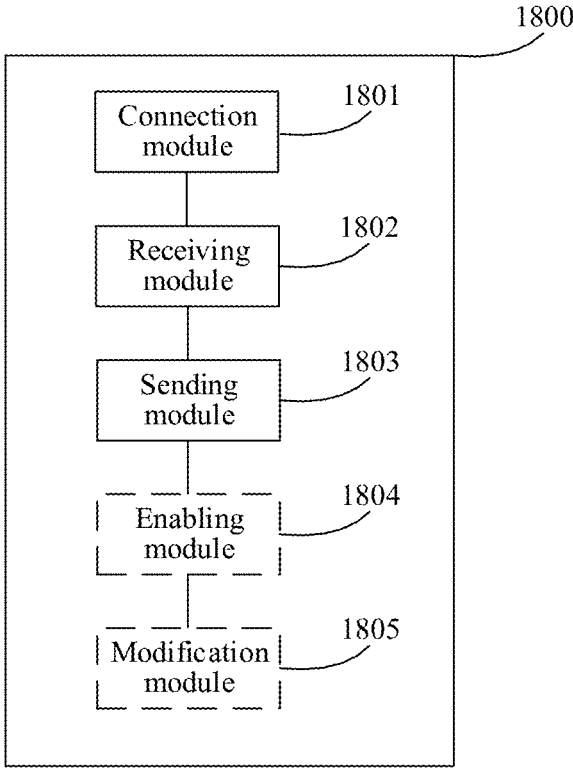
FIG. 18 is a schematic diagram 2 of a structure of a data transmission apparatus according to an embodiment of this application.

For example, FIG. 18 illustrates a schematic diagram of a structure of a data transmission device 1800. As shown in FIG. 18, the data transmission device 1800 may include: a connection module 1801, a receiving module 1802, a sending module 1803, and the like.

The connection module 1801 may be configured to establish a connection with a third electronic device.

The receiving module 1802 may be configured to receive, through the established connection, first data sent by the third electronic device.

The sending module 1803 may be configured to forward the first data to the first electronic device.

In another possible implementation, the receiving module 1802 may be further configured to receive a first connection instruction sent by the first electronic device, where the first connection instruction is used to indicate the second electronic device to establish a connection with the third electronic device.

The connection module 1801 may be further configured to establish a connection with the third electronic device in response to the first connection instruction received.

In another possible implementation, the receiving module 1802 may be further configured to receive a scan instruction sent by the first electronic device, where the scan instruction is used to instruct the second electronic device to scan for a connectable electronic device.

The sending module 1803 may be configured to: when the second electronic device detects a connectable electronic device through scanning, send first indication information to the first electronic device, where the first indication information is used to indicate the connectable electronic device detected by the second electronic device through scanning. The connectable electronic device includes the third electronic device.

In another possible implementation, the sending module 1803 may be further configured to send a second connection instruction to the third electronic device based on the first connection instruction received, where the second connection instruction is used to instruct the third electronic device to establish a connection with the second electronic device, so that the third electronic device establishes a connection with the second electronic device in response to the second connection instruction received.

In another possible implementation, the first connection instruction includes an identifier of the third electronic device.

In another possible implementation, the second connection instruction includes a first identifier, and the first identifier is used to instruct the third electronic device to automatically establish a connection with the second electronic device.

In another possible implementation, the receiving module 1802 may be further configured to receive an obtaining instruction sent by the first electronic device, where the obtaining instruction includes an identifier of the first data.

The sending module 1803 may be further configured to forward the obtaining instruction to the third electronic device.

In another possible implementation, the receiving module 1802 may be further configured to receive a first instruction sent by the first electronic device, where the first instruction is used to instruct the second electronic device to establish a connection between a port of the second electronic device and a port of the first electronic device.

The above data transmission apparatus may further include an enabling module 1804. The connection module 1801 may be configured to establish a connection between the port of the second electronic device and the port of the first electronic device based on the first instruction.

The receiving module 1802 may be further configured to receive a second instruction sent by the first electronic device, where the second instruction is used to instruct the second electronic device to enable a service corresponding to a first application. The first application is used for scanning for a connectable electronic device.

The enabling module 1804 may be configured to enable the service corresponding to the first application based on the second instruction.

In another possible implementation, the second connection instruction further includes a modified device name of the second electronic device. The above data transmission apparatus may further include a modification module 1805. The modification module 1805 may be configured to modify a device name of the second electronic device.

In another possible implementation, the first electronic device is a computer, the second electronic device is a mobile phone, and the third electronic device is a wearable electronic device.

Embodiments of this application further provide a data transmission apparatus. The data transmission apparatus may be applied to a third electronic device to implement the method in the foregoing embodiments. Functions of the display apparatus may be implemented by using hardware or may be implemented by using hardware executing corresponding software. The hardware or software includes one or more modules corresponding to the above function.

Figure 19:
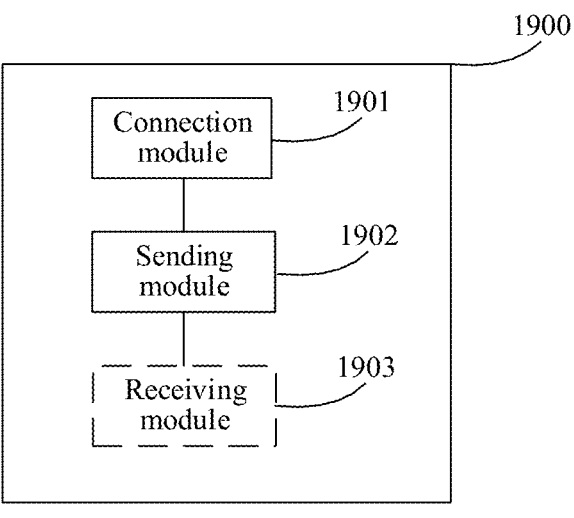
FIG. 19 is a schematic diagram 3 of a structure of a data transmission apparatus according to an embodiment of this application.

For example, FIG. 19 illustrates a schematic diagram of a structure of a data transmission device 1900. As shown in FIG. 19, the data transmission device 1900 may include: a connection module 1901, a sending module 1902, and the like.

The connection module 1901 may be configured to establish a connection with a second electronic device.

The sending module 1902 may be configured to send first data to the second electronic device through the established connection, so that the second electronic device forwards the first data to a first electronic device.

In another possible implementation, the data transmission apparatus may further include a receiving module 1903.

The receiving module 1903 may be configured to receive a second connection instruction sent by the second electronic device. The second connection instruction is a connection instruction sent by the second electronic device to the third electronic device in response to a first connection instruction sent by the first electronic device. The first connection instruction is used for instructing the second electronic device to establish a connection with the third electronic device.

The connection module 1901 may be further configured to establish a connection with the second electronic device in response to the second connection instruction.

In another possible implementation, the connection module 1901 may be further configured to automatically establish a connection with the second electronic device when the second connection instruction includes a first identifier. The first identifier is used for instructing the third electronic device to automatically establish a connection with the second electronic device.

In another possible implementation, the receiving module 1903 may be further configured to receive an obtaining instruction forwarded by the second electronic device. The obtaining instruction is sent by the first electronic device to the second electronic device. The obtaining instruction includes an identifier of the first data.

In another possible implementation, the second connection instruction further includes a modified device name of the second electronic device.

In another possible implementation, the first electronic device is a computer, the second electronic device is a mobile phone, and the third electronic device is a wearable electronic device.

It should be understood that, division of units or modules (hereinafter referred to as units) in the apparatus is merely logical function division. During an actual implementation, some or all of the units or modules may be integrated into a physical entity or may be physically separated. The units in the apparatus may all be implemented in a form of software invoked by a processing element; or may all be implemented in a form of hardware; or some units are implemented in a form of software invoked by a processing element, and some units are implemented in a form of hardware.

For example, the units may be a processing element that is independently arranged, or may be integrated in a chip of the apparatus for implementation. In addition, the units may be stored in a memory in a form of program code, and are invoked by a processing element of the apparatus to perform functions of the units. In addition, all or some of the units may be integrated together, or may be implemented independently. The processing element may also be referred to as a processor and may be an integrated circuit having a signal processing capability. In an implementation process, steps in the foregoing method or the foregoing units may be implemented by using a hardware integrated logical circuit in a processor element or may be implemented in a form of software invoked by a processing element.

In an example, the units in the apparatus may be configured as one or more integrated circuits implementing the method, for example, one or more ASICs, one or more DSPs, one or more FPGAs, or a combination of at least two integrated circuit forms thereof.

In another example, when a unit in the apparatus is implemented in a form of a processing element scheduling a program, the processing element may be a general-purpose processor, for example, a CPU or another processor that can invoke a program. In another example, the units may be integrated together and implemented in a form of a system-on-a-chip (system-on-a-chip, SOC).

In an implementation, the units of the apparatus for implementing the corresponding steps in the method may be implemented in a form of a processing element scheduling a program. For example, the apparatus may include a processing element and a storage element, where the processing element invokes a program stored in the storage element, to perform the method described in the foregoing method embodiments. The storage element may be a storage element located on the same chip as the processing element, that is, a storage-element-on-a-chip.

In another implementation, the program used for performing the method may be stored on a storage element located on a different chip from the processing element, that is, a storage-element-out-a-chip. In this case, the processing element invokes or loads the program from the storage-element-out-a-chip onto the storage-element-on-a-chip, to invoke the program and perform the method described in the foregoing method embodiments.

For example, embodiments of this application may further provide an apparatus, for example, an electronic device, which may include: a processor, and a memory configured to store instructions that can be executed by the processor. The processor is configured to, when executing the instructions, cause the electronic device to implement the data transmission method according to the foregoing embodiments. The memory may be arranged in the electronic device or may be arranged outside the electronic device. In addition, the processor includes one or more processors.

In still another implementation, the units of the apparatus for implementing the steps in the method may be configured as one or more processing elements. The processing elements may be arranged on the foregoing electronic device, and the processing elements may be integrated circuits, for example, one or more ASICs, one or more DSPs, one or more FPGAs, or a combination of the integrated circuits. The integrated circuits may be integrated to form a chip.

For example, embodiments of this application further provide a chip, and the chip may be applied to the electronic device. The chip includes one or more interface circuits and one or more processors, where the interface circuit and the processor are interconnected through a line; and the processor receives and executes computer instructions from the memory of the electronic device through the interface circuit to implement the method in the foregoing method embodiments.

Embodiments of this application further provide a computer program product, including the computer instructions run on the electronic device.

It may be clearly understood by a person skilled in the art from the foregoing description of the implementations that, for convenience and brevity of the description, division of the foregoing functional modules is merely used as an example for description. In actual application, the foregoing functions may be allocated to different functional modules based on a requirement, that is, an internal structure of the apparatus is divided into different functional modules, so as to complete all or some of the functions described above.

In the several embodiments provided in this application, it should be understood that the disclosed apparatus and method may be implemented in other manners. For example, the described apparatus embodiment is merely an example. For example, the module or unit division is merely logical function division. In actual implementation, there may be another division manner. For example, a plurality of units or components may be combined or integrated into another apparatus, or some features may be ignored or not performed. In addition, the displayed or discussed mutual coupling or direct coupling or communication connections may be implemented by using some interfaces. The indirect coupling or communication connections between the apparatuses or units may be implemented in electronic, mechanical, or other forms.

The units described as separate parts may or may not be physically separate, and parts displayed as units may be one physical unit or may be a plurality of physical units, may be located at one position, or may be distributed on a plurality of different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially or the part contributing to the related art or all or some of the technical solutions may be implemented in a form of a software product such as a program. The software product is stored in a program product such as a computer-readable storage medium and includes several instructions for instructing a device (which may be a single-chip microcomputer or a chip) or a processor (processor) to perform all or some of the steps of the methods described in the embodiments of this application. The foregoing storage medium includes: a USB flash drive, a removable hard disk, or a medium such as a ROM, a RAM, a magnetic disk, or an optical disc that can store program code.

For example, embodiments of this application may further provide a computer-readable storage medium, storing computer program instructions. The computer program instructions, when executed by an electronic device, cause the electronic device to implement the data transmission method in the foregoing method embodiments.

The foregoing descriptions are merely specific embodiments of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data transmission method, wherein the method is applied to a data transmission system, and the data transmission system comprises: a first electronic device, a second electronic device connected to the first electronic device, and a third electronic device, wherein the method comprises:

sending, by the first electronic device, a scan instruction to the second electronic device, wherein the scan instruction is used to instruct the second electronic device to scan for a connectable electronic device;

sending, by the second electronic device, first indication information to the first electronic device when the second electronic device detects a connectable electronic device through scanning; wherein the first indication information is used for indicating the connectable electronic device detected by the second electronic device through scanning; and the connectable electronic device comprises the third electronic device;

sending, by the first electronic device, a first connection instruction to the second electronic device, wherein the first connection instruction is used to instruct the second electronic device to establish a connection with the third electronic device;

establishing, by the second electronic device, a connection with the third electronic device in response to the first connection instruction received;

sending, by the third electronic device, first data to the second electronic device through the established connection;

receiving, by the second electronic device, the first data and forwarding the first data to the first electronic device; and receiving and displaying, by the first electronic device, the first data.

2. The method according to claim 1, wherein the establishing, by the second electronic device, a connection with the third electronic device in response to the first connection instruction received comprises: sending, by the second electronic device, a second connection instruction to the third electronic device based on the first connection instruction received; and establishing, by the third electronic device, a connection with the second electronic device in response to the second connection instruction received.

3. The method according to claim 1, wherein before the sending, by the first electronic device, a scan instruction to the second electronic device, the method further comprises:

displaying, by the first electronic device, a first interface, wherein the first interface comprises a first control, and the first control is used for triggering the first electronic device to send the scan instruction to the second electronic device; and receiving, by the first electronic device, a first operation of a user for the first control.

4. The method according to claim 1, wherein before the sending, by the first electronic device, a first connection instruction to the second electronic device, the method further comprises:

displaying, by the first electronic device, the connectable electronic device, wherein the connectable electronic device comprises the third electronic device; and receiving, by the first electronic device, a second operation of a user for the third electronic device.

5. The method according to claim 1, wherein the first connection instruction comprises an identifier of the third electronic device.

6. The method according to claim 2, wherein the second connection instruction comprises a first identifier, and the first identifier is used to instruct the third electronic device to automatically establish a connection with the second electronic device.

7. The method according to claim 3, wherein the first interface further comprises a second control, and before the sending, by the third electronic device, first data to the second electronic device through the established connection, the method further comprises:

receiving, by the first electronic device, a third operation of the user for the second control;

sending, by the first electronic device, an obtaining instruction to the second electronic device in response to the third operation, wherein the obtaining instruction comprises an identifier of the first data; and receiving, by the second electronic device, the obtaining instruction, and forwarding the obtaining instruction to the third electronic device.

8. The method according to claim 1, wherein the displaying, by the first electronic device, the first data comprises:

displaying, by the first electronic device, the first data in a preset manner based on a type of the first data.

9. The method according to claim 1, wherein the first electronic device is a computer, the second electronic device is a mobile phone, and the third electronic device is a wearable electronic device.

10. A data transmission method, applied to a first electronic device, wherein the first electronic device has been connected to a second electronic device, and the method comprises:

sending, by the first electronic device, a scan instruction to the second electronic device, wherein the scan instruction is used to instruct the second electronic device to scan for a connectable electronic device;

receiving, by the first electronic device, first indication information sent by the second electronic device; wherein the first indication information is used for indicating a connectable electronic device detected by the second electronic device through scanning; and the connectable electronic device comprises a third electronic device;

sending, by the first electronic device, a first connection instruction to the second electronic device, wherein the first connection instruction is used to instruct the second electronic device to establish a connection with the third electronic device;

receiving, by the first electronic device, first data forwarded by the second electronic device; the first data is data sent by the third electronic device to the second electronic device through a connection established between the third electronic device and the second electronic device; and displaying, by the first electronic device, the first data.

11. The method according to claim 10, wherein before the sending, by the first electronic device, a scan instruction to the second electronic device, the method further comprises:

displaying, by the first electronic device, a first interface, wherein the first interface comprises a first control, and the first control is used for triggering the first electronic device to send the scan instruction to the second electronic device; and receiving, by the first electronic device, a first operation of a user for the first control.

12. The method according to claim 11, wherein the first interface further comprises a second control, and before the receiving, by the first electronic device, first data forwarded by the second electronic device, the method further comprises:

receiving, by the first electronic device, a third operation of the user for the second control;

sending, by the first electronic device, an obtaining instruction to the second electronic device in response to the third operation, wherein the obtaining instruction comprises an identifier of the first data.

13. The method according to claim 10, wherein before the sending, by the first electronic device, a scan instruction to the second electronic device, the method further comprises:

sending, by the first electronic device, a first instruction to the second electronic device, wherein the first instruction is used to instruct the second electronic device to establish a connection between a port of the second electronic device and a port of the first electronic device;

sending, by the first electronic device, a second instruction to the second electronic device, wherein the second instruction is used to instruct the second electronic device to enable a service corresponding to a first application, and the first application is used for scanning for a connectable electronic device; and establishing, by the first electronic device, a socket.

14. A data transmission method, applied to a second electronic device, wherein the second electronic device has been connected to a first electronic device, and the method comprises:

receiving, by the second electronic device, a scan instruction sent by the first electronic device, wherein the scan instruction is used to instruct the second electronic device to scan for a connectable electronic device;

when the second electronic device detects a connectable electronic device through scanning, sending, by the second electronic device, first indication information to the first electronic device, wherein the first indication information is used to indicate the connectable electronic device detected by the second electronic device through scanning, and the connectable electronic device comprises a third electronic device;

receiving, by the second electronic device, a first connection instruction sent by the first electronic device, wherein the first connection instruction is used to instruct the second electronic device to establish a connection with the third electronic device;

establishing, by the second electronic device, a connection with the third electronic device in response to the first connection instruction received;

receiving, by the second electronic device through the established connection, first data sent by the third electronic device; and forwarding, by the second electronic device, the first data to the first electronic device.

15. The method according to claim 14, wherein the establishing, by the second electronic device, a connection with the third electronic device in response to the first connection instruction received comprises:

sending, by the second electronic device, a second connection instruction to the third electronic device based on the first connection instruction received, wherein the second connection instruction is used to instruct the third electronic device to establish a connection with the second electronic device, so that the third electronic device establishes a connection with the second electronic device in response to the second connection instruction received.

16. The method according to claim 15, wherein the second connection instruction comprises a first identifier, and the first identifier is used to instruct the third electronic device to automatically establish a connection with the second electronic device.

17. The method according to claim 14, wherein before the receiving, by the second electronic device through the established connection, first data sent by the third electronic device, the method further comprises:

receiving, by the second electronic device, an obtaining instruction sent by the first electronic device, wherein the obtaining instruction comprises an identifier of the first data; and forwarding, by the second electronic device, the obtaining instruction to the third electronic device.

18. The method according to claim 14, wherein before the receiving, by the second electronic device, a scan instruction sent by the first electronic device, the method further comprises:

receiving, by the second electronic device, a first instruction sent by the first electronic device, wherein the first instruction is used to instruct the second electronic device to establish a connection between a port of the second electronic device and a port of the first electronic device;

establishing, by the second electronic device, a connection between the port of the second electronic device and the port of the first electronic device based on the first instruction;

receiving, by the second electronic device, a second instruction sent by the first electronic device, wherein the second instruction is used to instruct the second electronic device to enable a service corresponding to a first application, and the first application is used for scanning for a connectable electronic device; and enabling, by the second electronic device, the service corresponding to the first application based on the second instruction.

19. The method according to claim 16, wherein the second connection instruction further comprises a modified device name of the second electronic device, and before the sending, by the second electronic device, a second connection instruction to the third electronic device, the method further comprises:

modifying, by the second electronic device, a device name of the second electronic device.

20. The method according to claim 14, wherein the first electronic device is a computer, the second electronic device is a mobile phone, and the third electronic device is a wearable electronic device.

\* \* \* \* \*